US007975471B2

(12) United States Patent
Miyashita

(10) Patent No.: US 7,975,471 B2
(45) Date of Patent: Jul. 12, 2011

(54) EXHAUST PURIFICATION APPARATUS OF INTERNAL COMBUSTION ENGINE AND CONTROL METHOD THEREOF

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1035 days.

(21) Appl. No.: 11/794,978

(22) PCT Filed: Aug. 16, 2006

(86) PCT No.: PCT/IB2006/002339

§ 371 (c)(1), (2), (4) Date: Jul. 10, 2007

(87) PCT Pub. No.: WO2007/023380

PCT Pub. Date: Mar. 1, 2007

(65) Prior Publication Data

US 2007/0289295 A1 Dec. 20, 2007

(30) Foreign Application Priority Data

Aug. 22, 2005 (JP) ................................ 2005-239681

(51) Int. Cl.
*F01N 3/10* (2006.01)
*F01N 3/00* (2006.01)

(52) U.S. Cl. ................. 60/301; 60/285; 60/276; 60/295

(58) Field of Classification Search .................... 60/285, 60/276, 301, 295
See application file for complete search history.

(56) References Cited

U.S. PATENT DOCUMENTS 5,657,625 A 8/1997 Koga et al.
6,318,075 B1 11/2001 Günther et al.
2004/0187481 A1 9/2004 Elwart et al.
2005/0193718 A1 * 9/2005 Surnilla et al. .................. 60/285

FOREIGN PATENT DOCUMENTS

DE 195 22 165 A1 12/1995
DE 199 10 503 C1 7/2000
DE 101 42 669 A1 4/2003
EP 0 902 172 A2 3/1999
EP 1 422 410 A2 5/2004
JP A 2004-68690 3/2004

* cited by examiner

*Primary Examiner* — Thomas E Denion
*Assistant Examiner* — Michael Carton
(74) *Attorney, Agent, or Firm* — Oliff & Berridge, PLC

(57) ABSTRACT

An engine has a first cylinder group and a second cylinder group. The first cylinder group and the second cylinder group are connected to a common NOx storage reduction catalyst via their corresponding exhaust passageways and their corresponding three-way catalysts, respectively. When the temperature of the NOx storage reduction catalyst is to be raised, the average air-fuel ratio of the first cylinder group is made rich, and the average air-fuel ration of the second cylinder group is made lean. At this time, in the first cylinder group, the air-fuel of two cylinders is made rich and the air-fuel ration of one cylinder is made lean, and in the second cylinder group, the air-fuel ratio of two cylinders is made lean and the air-fuel ratio of one cylinder is made rich, in accordance with an embodiment.

12 Claims, 28 Drawing Sheets

2 #4 #6 11 12 2 3 4 5 10 6 5 1 4 3 7 13 14 #1 #3 #5 8 9 20 30 31 LOAD SENSOR 27 A/D 25 CRANK ANGLE SENSOR INPUT PORT 21 22 ROM 32 27 A/D A/D 23 ROM 24 CPU OUTPUT PORT 28 26

EXHAUST PURIFICATION APPARATUS OF INTERNAL COMBUSTION ENGINE AND CONTROL METHOD THEREOF

BACKGROUND OF THE INVENTION

1. Field of the Invention

The invention relates to an exhaust purification apparatus of an internal combustion engine and a control method thereof.

2. Description of the Related Art

In a known 6-cylinder internal combustion engine (see, for example, Japanese Patent Publication Application No. JP-A-2004-68690), the cylinders are divided into a first cylinder group made up of three cylinders and a second cylinder group made up of the other three cylinders, and the cylinders of the first cylinder group are connected to a common first exhaust passageway, and the cylinders of the second cylinder group are connected to a common second exhaust passageway. Each of the first exhaust passageway and the second exhaust passageway is provided with an air-fuel ratio sensor and a three-way catalyst. Downstream of these three-way catalysts, the first exhaust passageway and the second exhaust passageway are connected to a common NOx storage reduction catalyst.

The NOx storage reduction catalyst requires that its temperature be sometimes raised in order to recover from SOx poisoning. When the temperature of the NOx storage reduction catalyst is to be raised, the air-fuel ratio is adjusted; for example, the air-fuel ratio in the three cylinders of the first cylinder group is made rich (lower than the stoichiometric ratio) and the air-fuel ratio in the three cylinders of the second cylinder group is made lean, in such a manner that the air-fuel ratio of the exhaust gas flowing into the NOx storage reduction catalyst becomes equal to the stoichiometric air-fuel ratio. At this time, the degree of richness and the degree of leanness are feedback-controlled via the air-fuel ratio sensors disposed in the first exhaust passageway and the second exhaust passageway so that the air-fuel ratio of the exhaust gas flowing into the NOx storage reduction catalyst becomes precisely equal to the stoichiometric air-fuel ratio.

If the air-fuel ratio of the three cylinders of the first cylinder group is made rich and the air-fuel ratio of the three cylinders of the second cylinder group is made lean so that the air-fuel ratio of the exhaust gas flowing into the NOx storage reduction catalyst becomes equal to the stoichiometric air-fuel ratio as just mentioned, the exhaust gas from the first cylinder group that contains a large amount of unburned HC and CO and the exhaust gas from the second cylinder group that contains a large amount of excess oxygen merge with each other at the NOx storage reduction catalyst. As a result, the large amount of unburned HC and CO is oxidized by the large amount of oxygen, and the thus-generated oxidative reaction heat raises the temperature of the NOx storage reduction catalyst.

In this case, in order to increase the amount of temperature rise of the NOx storage reduction catalyst, it is necessary to increase the degree of richness in the first cylinder group and increase the degree of leanness in the second cylinder group. However, in reality, increasing the degree of richness and the degree of leanness in this manner usually results in deviation from the range of air-fuel ratio that can be accurately detected by the air-fuel ratio sensors. As a result, there arises a problem of failing to control the air-fuel ratio of the exhaust gas flowing into the NOx storage reduction catalyst precisely to the stoichiometric air-fuel ratio.

Besides, the NOx storage reduction catalyst also has the function of a three-way catalyst. Therefore, this NOx storage reduction catalyst has functions of simultaneously removing or lessening the unburned HC and CO and the NOx in the exhaust gas when the air-fuel ratio of the exhaust gas is stoichiometric. After the rich air-fuel ratio exhaust gas and the lean air-fuel ratio exhaust gas have flown into the NOx storage reduction catalyst, these exhaust gases are not quite mixed but remain separate as a rich air-fuel ratio portion and a lean air-fuel ratio portion while in an upstream portion of the NOx storage reduction catalyst. It is not until they reach a downstream portion of the NOx storage reduction catalyst that the air-fuel ratio thereof becomes equal to the stoichiometric air-fuel ratio. Therefore, the unburned HC and CO and the NOx in exhaust gas are removed only in a downstream portion of the NOx storage reduction catalyst.

If the degree of richness of the first cylinder group is increased and the degree of leanness of the second cylinder group is increased, the region where the rich air-fuel ratio exhaust gas and the lean air-fuel ratio exhaust gas are not sufficiently mixed expands to the downstream side of the NOx storage reduction catalyst. In consequence, there arises a problem of having to increase the capacity of the NOx storage reduction catalyst so as to secure a sufficient region where the exhaust gas air-fuel ratio becomes stoichiometric for the purpose of removal of the unburned HC and CO and the NOx.

SUMMARY OF THE INVENTION

According to the first aspect of the invention, in an internal combustion engine having six or more cylinders wherein the cylinders are divided into a first cylinder group made up of at least three cylinders, and a second cylinder group made up of at least three cylinders, and the at least three cylinders of the first cylinder group are connected to a common first exhaust passageway, and the at least three cylinders of the second cylinder group are connected to a common second exhaust passageway, and the first exhaust passageway and the second exhaust passageway are respectively provided with catalysts, and the first exhaust passageway and the second exhaust passageway are connected to a common NOx storage reduction catalyst downstream of the catalysts, and wherein when a temperature of the NOx storage reduction catalyst is to be raised, an average air-fuel ratio of one cylinder group of the first cylinder group and the second cylinder group is made rich, and an average air-fuel ratio of the other cylinder group of the first cylinder group and the second cylinder group is made lean, an exhaust purification apparatus of the internal combustion engine is operated as follows. As for the cylinder group whose average air-fuel ratio is made rich when the temperature of the NOx storage reduction catalyst is to be raised, an air-fuel ratio in at least two cylinders is made rich and an air-fuel ratio in the other cylinder or cylinders is made stoichiometric or lean, or the air-fuel ratio in at least one cylinder is made rich and the air-fuel ratio in the other cylinder or cylinders is made stoichiometric. As for the cylinder group whose average air-fuel ratio is made lean when the temperature of the NOx storage reduction catalyst is to be raised, an air-fuel ratio in at least two cylinders is made lean and an air-fuel ratio in the other cylinder or cylinders is made stoichiometric or rich, or the air-fuel ratio in at least one cylinder is made lean and the air-fuel ratio in the other cylinder or cylinders is made stoichiometric.

According to the second aspect of the invention, in an internal combustion engine having six or more cylinders wherein the cylinders are divided into a first cylinder group made up of at least three cylinders, and a second cylinder group made up of at least three cylinders, and the at least three cylinders of the first cylinder group are connected to a common first exhaust passageway, and the at least three cylinders of the second cylinder group are connected to a common second exhaust passageway, and the first exhaust passageway and the second exhaust passageway are respectively provided with catalysts, and the first exhaust passageway and the second exhaust passageway are connected to a common NOx storage reduction catalyst downstream of the catalysts, and wherein when a temperature of the NOx storage reduction catalyst is to be raised, an average air-fuel ratio of one cylinder group of the first cylinder group and the second cylinder group is made rich, and an average air-fuel ratio of the other cylinder group of the first cylinder group and the second cylinder group is made lean, a control method for an exhaust purification apparatus of the internal combustion engine is operated as follows. As for the cylinder group whose average air-fuel ratio is made rich when the temperature of the NOx storage reduction catalyst is to be raised, an air-fuel ratio in at least two cylinders is made rich and an air-fuel ratio in the other cylinder or cylinders is made stoichiometric or lean, or the air-fuel ratio in at least one cylinder is made rich and the air-fuel ratio in the other cylinder or cylinders is made stoichiometric. As for the cylinder group whose average air-fuel ratio is made lean when the temperature of the NOx storage reduction catalyst is to be raised, an air-fuel ratio in at least two cylinders is made lean and an air-fuel ratio in the other cylinder or cylinders is made stoichiometric or rich, or the air-fuel ratio in at least one cylinder is made lean and the air-fuel ratio in the other cylinder or cylinders is made stoichiometric.

Therefore, the apparatus and control method for the apparatus are able to increase the amount of unburned HC and CO discharged and the amount of excess oxygen discharged which are supplied to the NOx storage reduction catalyst without considerably increasing the degree of richness nor the degree of leanness of the average air-fuel ratio of each cylinder group.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
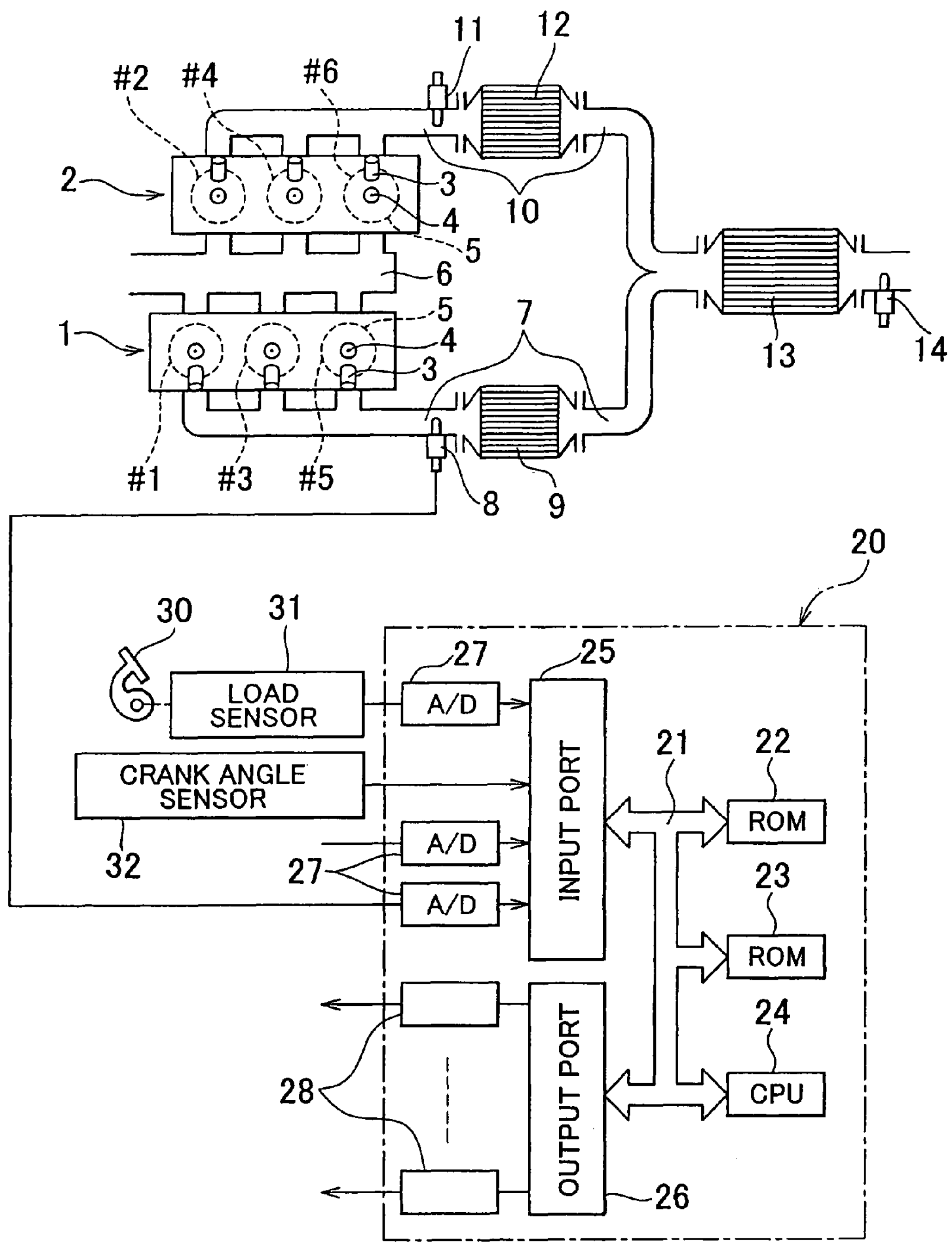
FIG. 1 is an overall view of a V-type 6-cylinder engine.

FIG. 1 shows a V-type 6-cylinder engine that has a first bank 1 and a second bank 2. As shown in FIG. 1, a first cylinder group constituting the first bank 1 has three cylinders 5, that is, No. 1 cylinder #1, No. 3 cylinder #3 and No. 5 cylinder #5, each of which is equipped with a fuel injection valve 3 and an ignition plug 4. Similarly, a second cylinder group constituting the second bank 2 has three cylinders 5, that is, No. 2 cylinder #2, No. 4 cylinder #4 and No. 6 cylinder #6, each of which is equipped with a fuel injection valve 3 and an ignition plug 4. The cylinders 5 are supplied with intake air via a common intake passageway 6.

A first exhaust passageway 7 is connected to the first cylinder group 1. An air-fuel ratio sensor 8 and a three-way catalyst 9 are disposed in the first exhaust passageway 7. Likewise, a second exhaust passageway 10 is connected to the second cylinder group 2. An air-fuel ratio sensor 11 and a three-way catalyst 12 are disposed in the second exhaust passageway 10, too. The first exhaust passageway 7 and the second exhaust passageway 10 merge together and connect with a common NOx storage reduction catalyst 13. Still another air-fuel ratio sensor 14 is disposed downstream of the NOx storage reduction catalyst 13.

An electronic control unit 20 is formed by a digital computer, and is provided with a ROM (read-only memory) 22, a RAM (random access memory) 23, a CPU (microprocessor) 24, an input port 25 and an output port 26 which are interconnected via a bidirectional bus 21. Output signals of the air-fuel ratio sensors 8, 11, 14 are input to the input port 25 via corresponding A/D converters 27. A load sensor 31 that generates an output voltage proportional to the amount of depression of an accelerator pedal 30 is connected to the accelerator pedal 30. The output voltage of the load sensor 31 is input to the input port 25 via a corresponding one of the A/D converters 27. Furthermore, a crank angle sensor 32 is connected to the input port 25. For example, the crank angle sensor 32 generates an output pulse at every 30° rotation of a crankshaft. On the other hand, the output port 26 is connected to the fuel injection valves 3 and the ignition plugs 4, via corresponding drive circuits 28.

The NOx storage reduction catalyst 13 shown in FIG. 1 has functions of storing NOx from exhaust gas when the air-fuel ratio of the exhaust gas flowing into the NOx storage reduction catalyst 13 is lean, and of releasing and reducing stored NOx when the air-fuel ratio of the exhaust gas flowing into the NOx storage reduction catalyst 13 is rich. Normally in the internal combustion engine shown in FIG. 1, the air-fuel ratio in the first cylinder group 1 and the second cylinder group 2 is lean. Therefore, during the normal condition, NOx contained in exhaust gas is stored into the NOx storage reduction catalyst 13. Furthermore, in this internal combustion engine, before the amount of NOx stored in the NOx storage reduction catalyst 13 reaches a saturation level, the air-fuel ratio of the exhaust gas flowing into the NOx storage reduction catalyst 13 is temporarily made rich, whereby NOx stored in the NOx storage reduction catalyst 13 is released.

Exhaust gas also contains SOx, which is also stored into the NOx storage reduction catalyst 13. As the amount of SOx stored in the NOx storage reduction catalyst 13 increases, the storable amount of NOx decreases. Therefore, when the amount of stored SOx has increased, it is necessary to release the stored SOx from the NOx storage reduction catalyst 13. However, SOx is less readily released than NOx. In order to release SOx from the NOx storage reduction catalyst 13, it is necessary to raise the temperature of the NOx storage reduction catalyst 13 and keep the air-fuel ratio of the exhaust gas flowing into the NOx storage reduction catalyst 13 at the stoichiometric air-fuel ratio or in the rich side thereof.

Thus, in order to release SOx from the NOx storage reduction catalyst 13, it is necessary to first raise the temperature of the NOx storage reduction catalyst 13. Therefore, in a first aspect of the invention, when the temperature of the NOx storage reduction catalyst 13 is to be raised, the average air-fuel ratio of one of the two cylinder groups, for example, the first cylinder group 1, is made rich and the average air-fuel ratio of the other cylinder group, for example, the second cylinder group 2, is made lean so that the air-fuel ratio of the exhaust gas flowing into the NOx storage reduction catalyst 13 becomes equal to the stoichiometric air-fuel ratio. Specifically, exhaust gas containing a large amount of unburned HC and CO is sent from the first cylinder group 1 into the NOx storage reduction catalyst 13, and exhaust gas containing a large amount of excess oxygen is sent from the second cylinder group 2 into the NOx storage reduction catalyst 13. Due to heat of the oxidative reaction of the unburned HC and CO with the excess oxygen, the temperature of the NOx storage reduction catalyst 13 rises.

Figure 2:
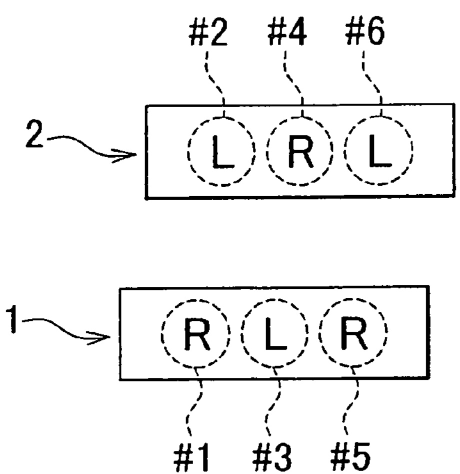
FIG. 2 is a diagram showing only a first cylinder group and a second cylinder group of the engine shown in FIG. 1.

This will next be described in detail with reference to FIG. 2. FIG. 2 shows only the first cylinder group 1 and the second cylinder group 2 of the V-type 6-cylinder engine shown in FIG. 1. Hereinafter, when the V-type 6-cylinder engine is shown, only the first cylinder group 1 and the second cylinder group 2 are shown while the other components and the like thereof are omitted as in FIG. 2. Besides, in the cylinders #1 to #6 in the embodiment of the invention, mixture of rich air-fuel ratio, or mixture of the stoichiometric air-fuel ratio, or mixture of lean air-fuel ratio is combusted. Hereinafter, "R" is shown in a broken-line circle indicating a cylinder, if that cylinder undergoes combustion of a rich air-fuel ratio mixture. This cylinder is termed rich cylinder. Similarly, "S" is shown in a broken-line circle indicating a cylinder, if that cylinder undergoes combustion of a stoichiometric air-fuel ratio mixture. This cylinder is termed stoichiometric cylinder. Furthermore, "L" is shown in a broken-line circle indicating a cylinder, if that cylinder undergoes combustion of a lean air-fuel ratio mixture. This cylinder is termed lean cylinder. In addition, the combustion sequence of the cylinders of the V-type 6-cylinder engine shown in FIGS. 1 and 2 is #1-#2-#3-#4-#5-#6.

FIG. 2 shows an example case of the air-fuel ratios of the cylinders set when the temperature of the NOx storage reduction catalyst 13 needs to be raised. In this example case, as shown in FIG. 2, No. 1 cylinder #1 is a rich cylinder R, and No. 3 cylinder #3 is a lean cylinder L, and No. 5 cylinder #5 is a rich cylinder R, in the first cylinder group 1. On the other hand, in the second cylinder group 2, No. 2 cylinder #2 is a lean cylinder L, and No. 4 cylinder #4 is a rich cylinder R, and No. 6 cylinder #6 is a lean cylinder L. That is, in this example case, the average air-fuel ratio of exhaust gas of the first cylinder group 1 is rich, and the average air-fuel ratio of exhaust gas of the second cylinder group 2 is lean.

The arrangement of the related-art technology is different from the arrangement of FIG. 2 in that No. 3 cylinder #3 is a rich cylinder R, and the No. 4 cylinder #4 is a lean cylinder L. That is, in the related-art technology, all the cylinders of the first cylinder group 1 are rich cylinders R, and all the cylinders of the second cylinder group 2 are lean cylinders L. In this case, the amount of unburned HC and CO discharged from the first cylinder group 1 is larger, and the degree of richness of the first cylinder group 1 required for producing the oxidative reaction heat for the temperature raising of the NOx storage reduction catalyst 13 is higher. Furthermore, the degree of leanness of the second cylinder group 2 becomes higher. Therefore, a problem arises in which the air-fuel ratio of the exhaust gas flowing into the NOx storage reduction catalyst 13 cannot be controlled precisely to the stoichiometric air-fuel ratio, as stated in the beginning of this specification. Moreover, in order to sufficiently secure a region where the stoichiometric air-fuel ratio of exhaust gas is achieved, the capacity of the NOx storage reduction catalyst 13 needs to be increased, which presents another problem.

However, if one of the cylinders of the first cylinder group 1 whose average air-fuel ratio is made rich, for example, No. 3 cylinder #3, is caused to be a lean cylinder L, and one of the cylinders of the second cylinder group 2 whose average air-fuel ratio is made lean, for example, No. 4 cylinder #4, is caused to be a rich cylinder R as shown in FIG. 2, it is possible to increase the amount of unburned HC and CO discharged and therefore increase the oxidative reaction heat without causing the aforementioned problems. That is, if the degree of richness of rich cylinders R is increased and the degree of leanness of lean cylinders L is increased as indicated in the example shown in FIG. 2, the amount of unburned HC and CO discharged increases and the amount of excess oxygen discharged increases, so that the oxidative reaction heat increases. However, although the degree of richness of the rich cylinders R is increased and the degree of leanness of the lean cylinders L is increased, the average degree of richness of the first cylinder group 1 does not become so high, and the average degree of leanness of the second cylinder group 2 does not become so high, as can be seen from the example shown in FIG. 2. Hence, the aforementioned problems do not arise.

It is to be noted herein that the arrangement of rich cylinders R and lean cylinders L shown in FIG. 2 which makes it possible to increase the discharged amount of unburned HC and CO without causing the aforementioned problems is merely an example. As for the first cylinder group 1, any arrangement is permissible as long as any two of the cylinders are rich cylinders R and the other cylinder is a lean cylinder L. As for the second cylinder group 2, any arrangement is permissible as long as any two of the cylinders are lean cylinders L and the other cylinder is a rich cylinder R.

Figure 3:
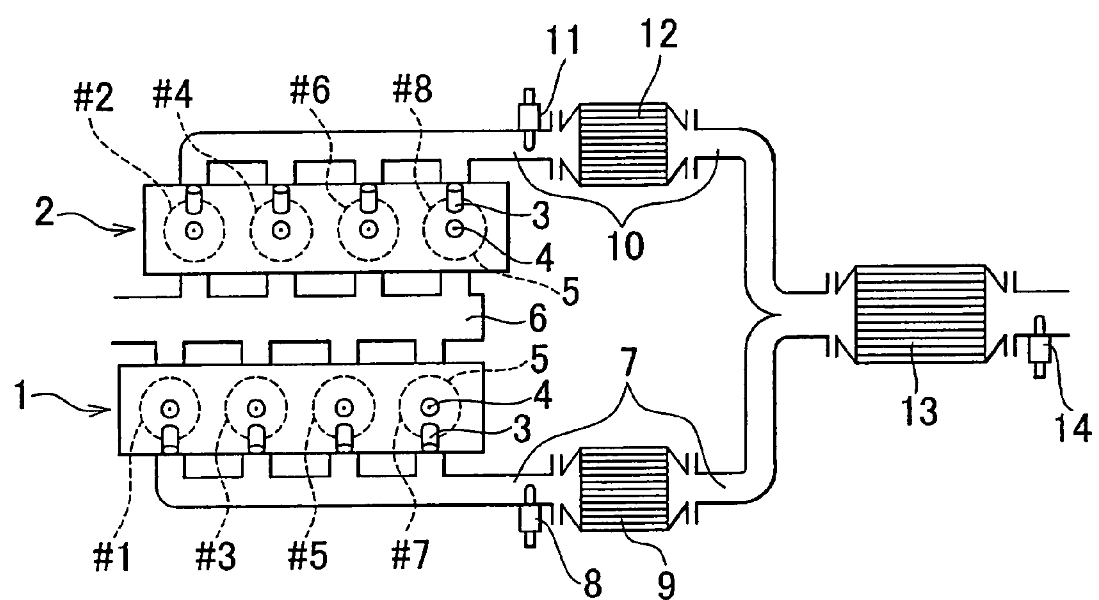
FIG. 3 is an overall view of a V-type 8-cylinder engine.
Figure 4:
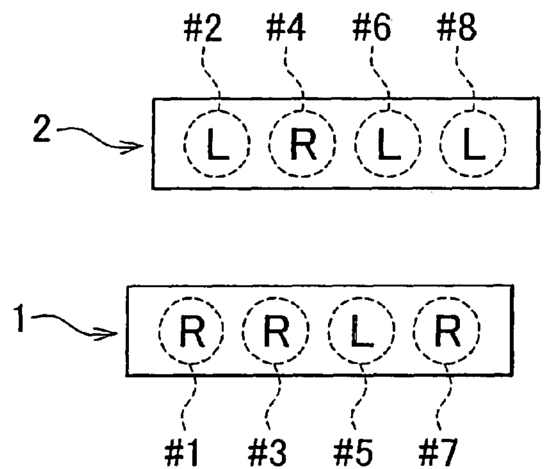
FIG. 4 is a diagram showing only a first cylinder group and a second cylinder group of the engine shown in FIG. 3.

FIG. 3 shows a case where an embodiment of the invention is applied to a V-type 8-cylinder engine. In this embodiment, No. 1 cylinder #1, No. 3 cylinder #3, No. 5 cylinder #5 and No. 7 cylinder #7 of a first cylinder group 1 are connected to a common first exhaust passageway 7, and No. 2 cylinder #2, No. 4 cylinder #4, No. 6 cylinder #6 and No. 8 cylinder #8 of a second cylinder group 2 are connected to a common second exhaust passageway 10. FIG. 4, similarly to FIG. 2, shows only the first cylinder group 1 and the second cylinder group 2 shown in FIG. 3. In addition, the combustion sequence of the cylinders of this V-type 8-cylinder engine is #1-#8-#7-#3-#6-#5-#4-#2.

Referring to FIG. 4, No. 1 cylinder #1, No. 3 cylinder #3 and No. 7 cylinder #7 are rich cylinders R, and No. 5 cylinder #5 is a lean cylinder L, in the first cylinder group 1. In the second cylinder group 2, No. 2 cylinder #2, No. 6 cylinder #6 and No. 8 cylinder #8 are lean cylinders L, and No. 4 cylinder #4 is a rich cylinder R. The arrangement of rich cylinders R and lean cylinders L shown in FIG. 4 is a mere example. As for the first cylinder group 1, any arrangement is permissible as long as any three of the cylinders are rich cylinders R and the other cylinder is a lean cylinder L. As for the second cylinder group 2, any arrangement is permissible as long as any three of the cylinders are lean cylinders L and the other cylinder is a rich cylinder R.

Figure 5:
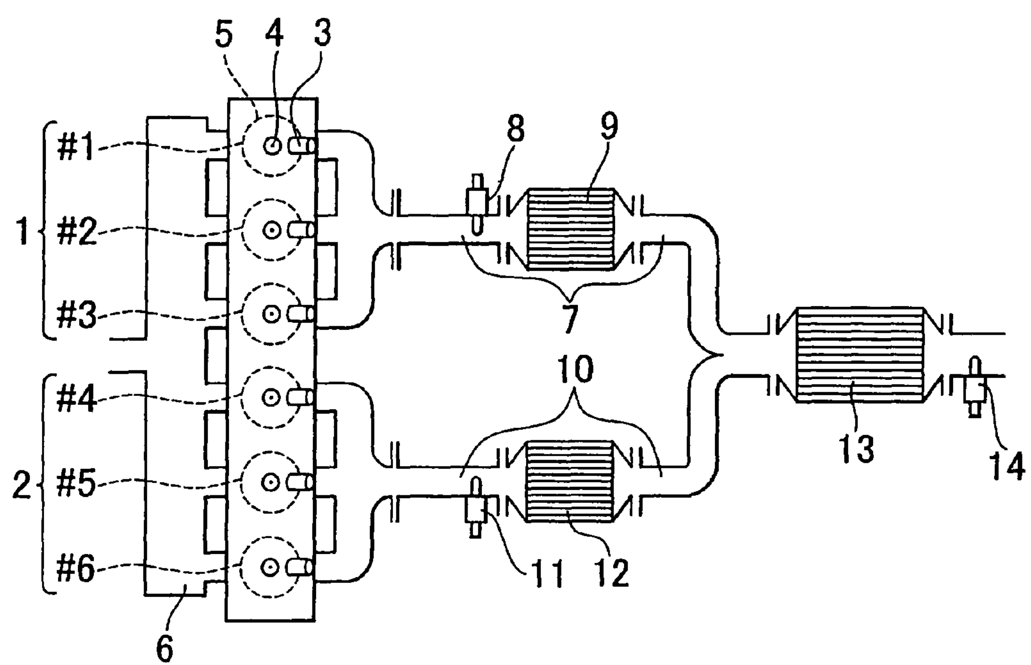
FIG. 5 is an overall view of an in-line 6-cylinder engine.
Figure 6:
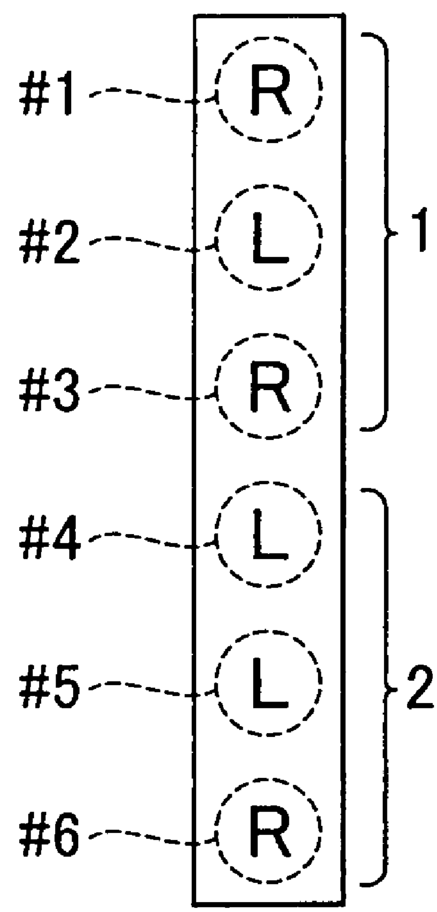
FIG. 6 is a diagram showing only a first cylinder group and a second cylinder group of the engine shown in FIG. 5.

FIG. 5 shows a case where an embodiment of the invention is applied to an in-line 6-cylinder engine. In this embodiment, No. 1 cylinder #1, No. 2 cylinder #2 and No. 3 cylinder #3 of a first cylinder group 1 are connected to a common first exhaust passageway 7, and No. 4 cylinder #4, No. 5 cylinder #5 and No. 6 cylinder #6 of a second cylinder group 2 are connected to a common second exhaust passageway 10. FIG. 6, similarly to FIG. 2, shows only the first cylinder group 1 and the second cylinder group 2 shown in FIG. 5. In addition, the combustion sequence of the cylinders of this in-line 6-cylinder engine is #1-#5-#3-#6-#2-#4.

Referring to FIG. 6, No. 1 cylinder #1 and No. 3 cylinder #3 are rich cylinders R, and No. 2 cylinder #2 is a lean cylinder L, in the first cylinder group 1. In the second cylinder group 2, No. 4 cylinder #4 and No. 5 cylinder #5 are lean cylinders L, and No. 6 cylinder #6 is a rich cylinder R. The arrangement of rich cylinders R and lean cylinders L shown in FIG. 6 is a mere example. As for the first cylinder group 1, any arrangement is permissible as long as any two of the cylinders are rich cylinders R and the other cylinder is a lean cylinder L. As for the second cylinder group 2, any arrangement is permissible as long as any two of the cylinders are lean cylinders L and the other cylinder is a rich cylinder R.

Thus, there is a relatively great degree of freedom in determining which cylinders are to be selected as rich cylinders R and which cylinders are to be selected as lean cylinders L. However, it is preferable to take into consideration the occurrence of vibration in determining which cylinders are to be selected as rich cylinders R or lean cylinders L. Specifically, repeated combustions in the engine serve as vibromotive force that causes vibration in a vehicle body or the like. In this case, the higher the frequency of the vibromotive force occurring in the engine, the less likely vibration is to occur in the vehicle body and the like, because higher frequencies are further apart from the resonance frequency of the vehicle body and the like. Besides, the higher the frequency of the vibromotive force occurring in the engine, the less the vibromotive force occurring in the engine becomes, and therefore the less likely vibration is to occur in the vehicle body and the like. In short, in order to make the vibration of the vehicle body and the like less likely to occur, it is preferable to increase the frequency of the vibromotive force that occurs in the engine up to as high a frequency as possible.

Figure 7A:
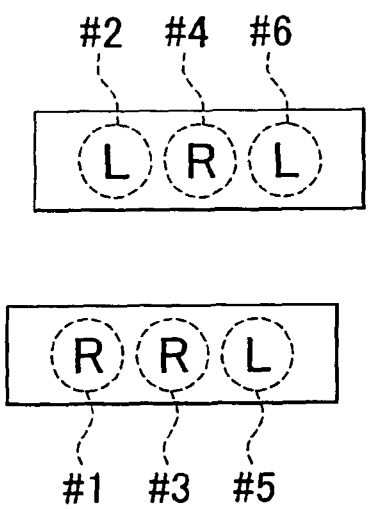
FIGS. 7A and 7B are diagrams showing a preferable example of a cylinder arrangement in a V-type 6-cylinder engine.
Figure 7B:
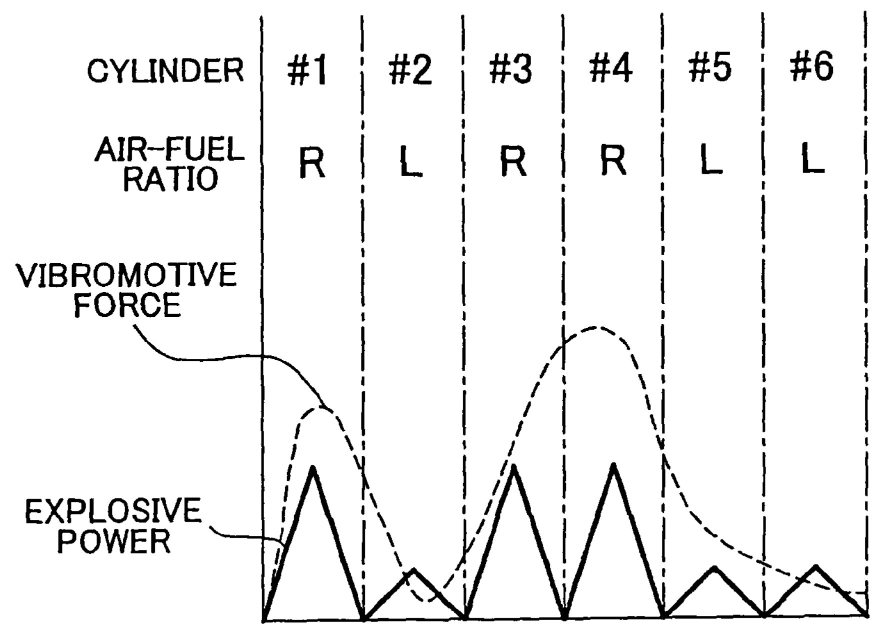

Therefore, it is preferable to determine rich cylinders R and lean cylinders L so that the frequency of the vibromotive force that occurs in the engine becomes high. Firstly, with reference to FIGS. 7A and 7B, an arrangement of rich cylinders R and lean cylinders L will be described. FIG. 7A shows an arrangement of rich cylinders R and lean cylinders L in a V-type 6-cylinder engine. FIG. 7B shows the air-fuel ratio and the explosive power of each of the cylinders #1 to #6 shown in FIG. 7A. The air-fuel ratio is indicated by R (rich), S (stoichiometric) and L (lean), and the explosive power, that is, the output at the time of combustion, is indicated by a solid line in the sequence of combustion #1-#2-#3-#4-#5-#6. Besides, FIG. 7B shows the vibromotive force generated by the engine, by a broken line. The indications and the like just described in conjunction with FIGS. 7A and 7B are the same with FIGS. 8A and 8B and the drawings that follow.

Needless to mention, the explosive power of a rich cylinder R, that is, the output thereof at the time of combustion, is greater than the explosive power of a stoichiometric cylinder S, that is, the output thereof at the time of combustion, and the explosive power of a stoichiometric cylinder S, that is, the output thereof at the time of combustion, is greater than the explosive power of a lean cylinder L, that is, the output thereof at the time of combustion. The solid line in FIG. 7B diagrammatically shows the explosive power, that is, the output at the time of combustion, in each cylinder. As can be understood from FIG. 7B, the vibromotive force caused by the engine becomes higher at the time of combustion of a rich cylinder R whose explosive power is great, and becomes lower at the time of combustion of a lean cylinder L whose explosive power is small.

Figure 8A:
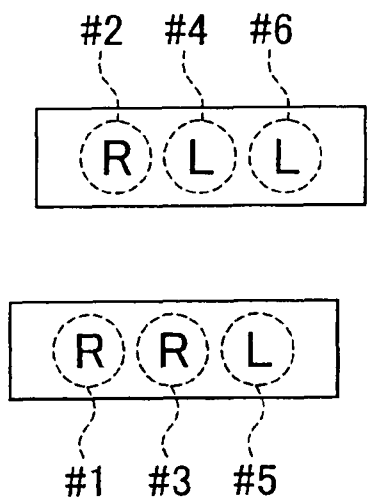
FIGS. 8A and 8B are diagrams showing an unpreferable example of a cylinder arrangement in a V-type 6-cylinder engine.
Figure 8B:
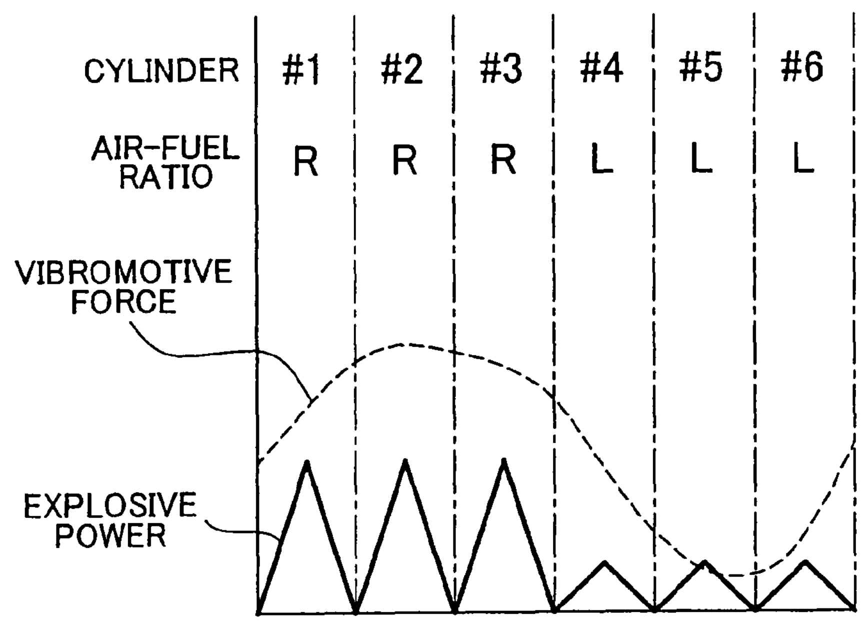

In the example shown in FIGS. 7A and 7B, the lean cylinder #2 is present between the rich cylinder #1 and the rich cylinders #3, #4, and therefore the broken line of the vibromotive force has two peaks in one cycle. FIGS. 8A and 8B show a case where combustion occurs three times consecutively in rich cylinders R. In this case, the broken line of the vibromotive force has only one peak in one cycle. Therefore, the frequency of the vibromotive force is higher in the case shown in FIGS. 7A and 7B than in the case shown in FIGS. 8A and 8B. That is, the arrangement of rich cylinders R and lean cylinders L shown in FIG. 7A is a preferable one.

On the other hand, the arrangement of rich cylinders R and lean cylinders L shown in FIG. 8A is an unpreferable one. That is, an arrangement of rich cylinders R and lean cylinders L such that combustion occurs three times consecutively in rich cylinders R needs to be avoided. Therefore, in the embodiment of the invention, an arrangement of rich cylinders R and lean cylinders L is determined such that combustion does not occur three or more times consecutively in rich cylinders R when combustion occurs successively in the cylinders in accordance with a predetermined sequence of combustion.

While FIG. 7A shows a preferable example of the arrangement of rich cylinders R and lean cylinders L, there are preferable arrangements other than the arrangement shown in FIG. 7A. For example, the arrangement shown in FIG. 7A may be changed so that the No. 3 cylinder #3 is a lean cylinder L and No. 5 cylinder #5 is a rich cylinder R, or so that No. 4 cylinder #4 is a lean cylinder L and No. 6 cylinder #6 is a rich cylinder R.

Figure 9A:
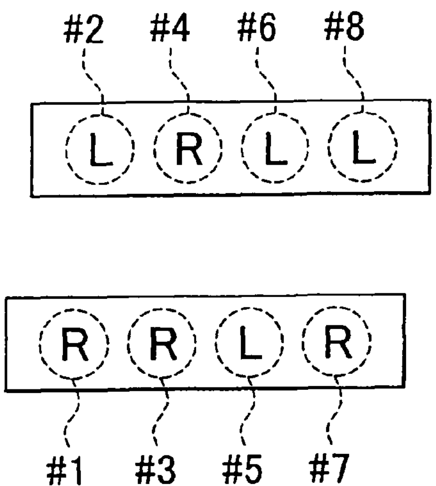
FIGS. 9A and 9B are diagrams showing a preferable example of an arrangement of cylinders in a V-type 8-cylinder engine.
Figure 9B:
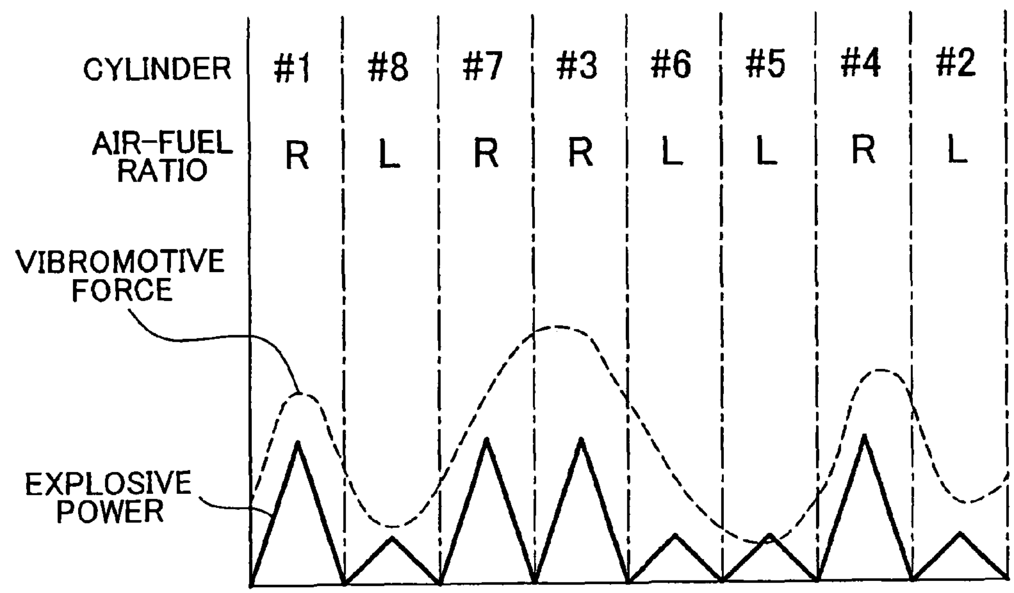
Figure 10A:
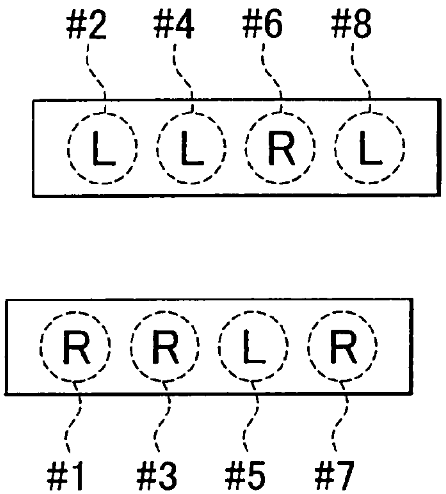
FIGS. 10A and 10B are diagrams showing an unpreferable example of a cylinder arrangement in a V-type 8-cylinder engine.
Figure 10B:
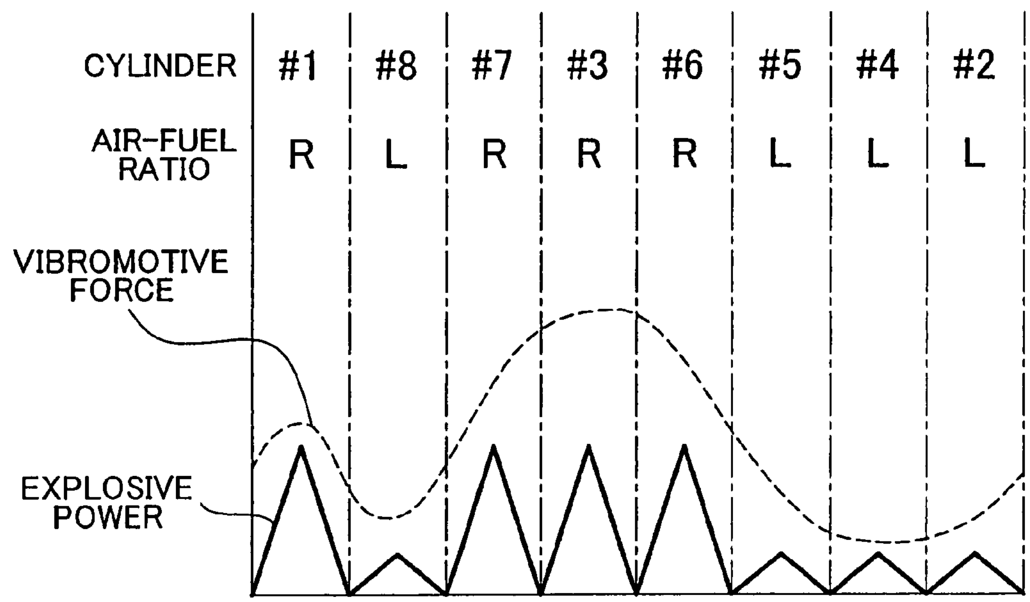

FIGS. 9A and 9B, and FIGS. 10A and 10B show cases where the above-described concepts are applied to a V-type 8-cylinder engine. FIGS. 11A and 11B, and FIGS. 12A and 12B show cases where the above-described concepts are applied to an in-line 6-cylinder engine. FIGS. 9A and 9B show a preferable example arrangement of rich cylinders R and lean cylinders L in a V-type 8-cylinder engine where combustion does not occur three or more times consecutively in rich cylinders R, whereas FIGS. 10A and 10B show an unpreferable example arrangement of rich cylinders R and lean cylinders L where combustion occurs three or more times consecutively in rich cylinders R. Although there are many preferable arrangements other than the one shown n FIGS. 9A and 9B, and many unpreferable arrangements other than the one shown in FIGS. 10A and 10B, the description of those arrangements is omitted herein.

Figure 11A:
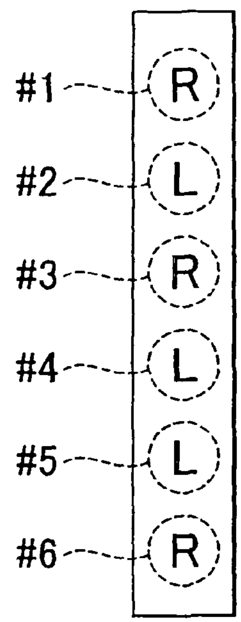
FIGS. 11A and 11B are diagrams showing a preferable example of a cylinder arrangement in an in-line 6-cylinder engine.
Figure 11B:
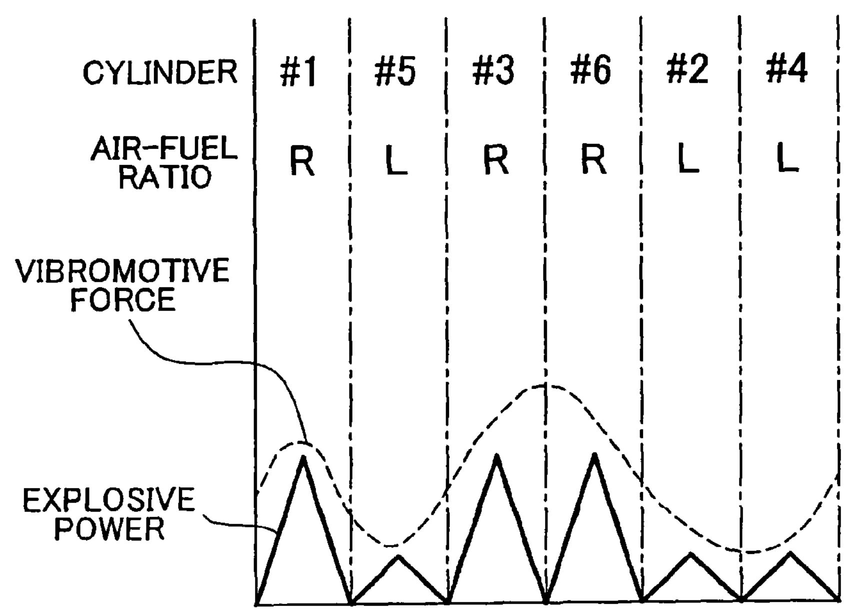
Figure 12A:
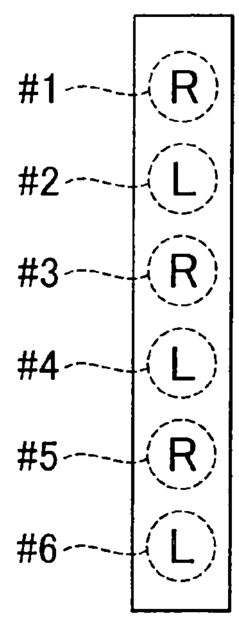
FIGS. 12A and 12B are diagrams showing an unpreferable example of a cylinder arrangement in an in-line 6-cylinder engine.
Figure 12B:
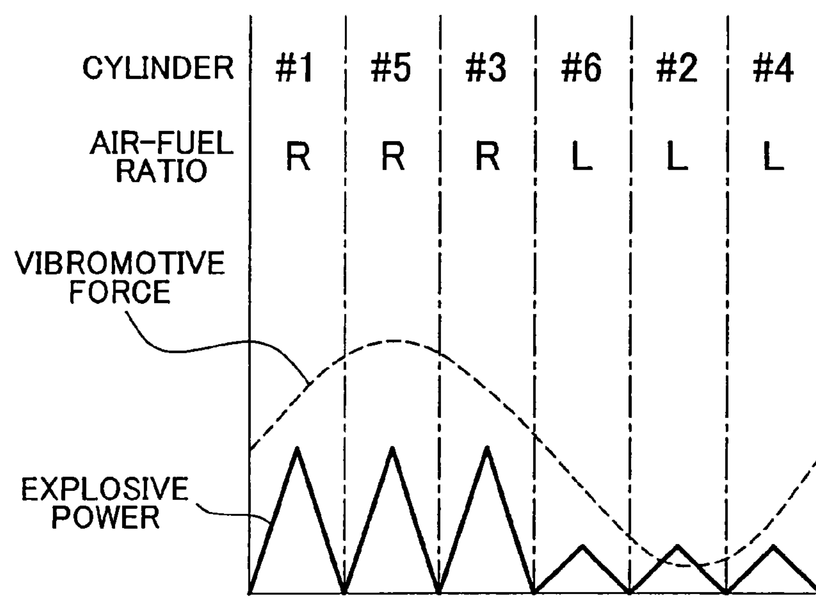

On the other hand, FIGS. 11A and 11B show a preferable example arrangement of rich cylinders R and lean cylinders L in an in-line 6-cylinder engine where combustion does not occur three or more times consecutively in rich cylinders R. FIGS. 12A and 12B show an unpreferable example arrangement of rich cylinders R and lean cylinders L where combustion occurs three or more times consecutively in rich cylinders R. Although there are many preferable arrangements other than the one shown in FIG. 11A and many unpreferable arrangements other than the one shown in FIG. 12A, the description of those arrangements is omitted herein.

Next, cases where stoichiometric cylinders S are added to rich cylinders R and lean cylinders L will be described. FIGS. 13A to 13D show various examples of cylinder combinations for a V-type 6-cylinder engine in which stoichiometric cylinders S are added. Specifically, in an example combination shown in FIG. 13A, a first cylinder group 1 is made up of two rich cylinders R and one stoichiometric cylinder S, and a second cylinder group 2 is made up of two lean cylinders L and one stoichiometric cylinder S. In an example combination shown in FIG. 13B, a first cylinder group 1 is made up of one rich cylinder R and two stoichiometric cylinders S, and a second cylinder group 2 is made up of one lean cylinder L and two stoichiometric cylinders S. In an example combination shown in FIG. 13C, a first cylinder group 1 is made up of one rich cylinder R and two stoichiometric cylinders S, and a second cylinder group 2 is made up of two lean cylinders L and one stoichiometric cylinder S. In an example combination shown in FIG. 13D, a first cylinder group 1 is made up of two rich cylinders R and one stoichiometric cylinder S, and a second cylinder group 2 is made up of one lean cylinder L and two stoichiometric cylinders S.

In addition, in any one of the example arrangements shown in FIGS. 13A to 13D, the average air-fuel ratio of the first cylinder group 1 is rich, and the average air-fuel ratio of the second cylinder group 2 is lean. Therefore, in embodiments of the invention, including the cases shown in FIGS. 13A to 13D as well, the engine is operated as follows. That is, as for the cylinder group whose average air-fuel ratio is made rich when the temperature of the NOx storage reduction catalyst 13 is to be raised, the air-fuel ratio in at least two cylinders is made rich and the air-fuel ratio in the other cylinder or cylinders is made stoichiometric or lean, or the air-fuel ratio in at least one cylinder is made rich and the air-fuel ratio in the other cylinder or cylinders is made stoichiometric.

Furthermore, in the embodiments of the invention, as for the cylinder group whose average air-fuel ratio is made lean when the temperature of the NOx storage reduction catalyst 13 is to be raised, the air-fuel ratio in at least two cylinders is made lean and the air-fuel ratio in the other cylinder or cylinders is made stoichiometric or rich, or the air-fuel ratio in at least one cylinder is made lean and the air-fuel ratio in the other cylinder or cylinders is made stoichiometric.

Where stoichiometric cylinders S are added as shown in FIGS. 13A to 13D, the arrangements that achieve high frequencies of vibromotive force change, and the control of the amount of oxidative reaction heat generated becomes easier, depending on the manner in which the stoichiometric cylinders S are added. Hereinafter, the control of oxidative reaction heat will first be described, and then the arrangements that achieve high frequencies of the vibromotive force will be described.

Figure 13A:
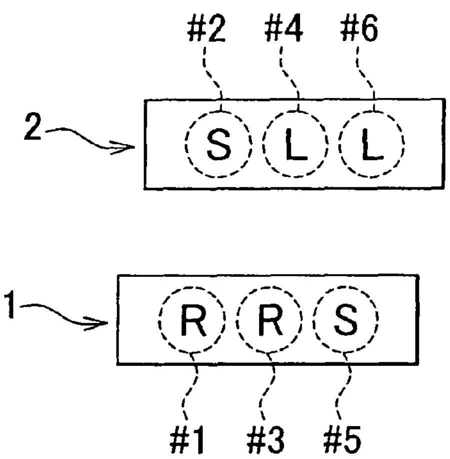
FIGS. 13A to 13D are diagrams showing various cylinder arrangements for V-type 6-cylinder engines where stoichiometric cylinders are added.
Figure 13B:
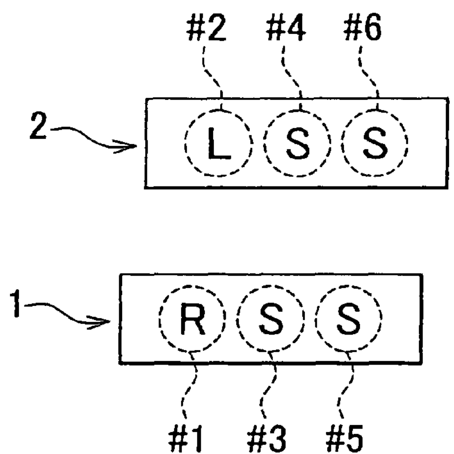
Figure 13C:
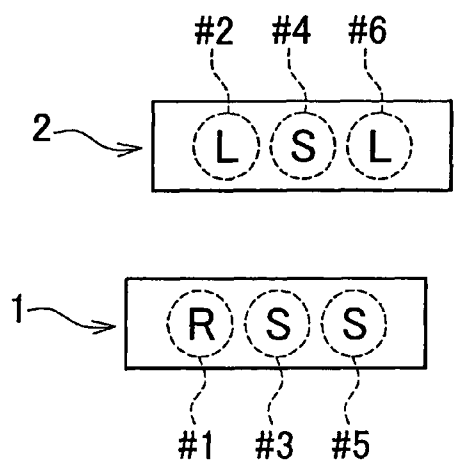
Figure 13D:
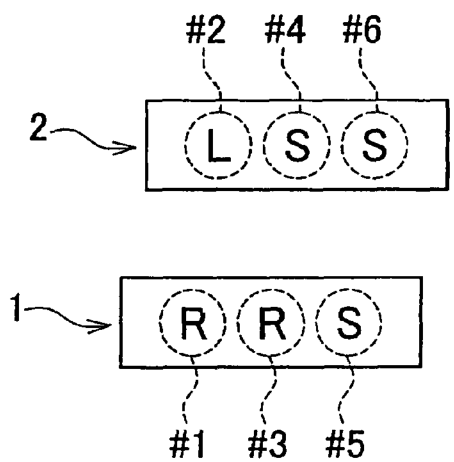

In the case shown in FIG. 13A, two rich cylinders R and two lean cylinders L are provided, so that the oxidative reaction heat to be provided is the greatest, among the four cases shown in FIGS. 13A to 13D. In contrast, in the case shown in FIG. 13B, only one rich cylinder R and only one lean cylinder L are provided, so that the oxidative reaction heat to be provided is the least. In the case shown in FIG. 13C and the case shown in FIG. 13D, the amount of unburned HC and CO oxidized is considered to be larger than in the case shown in FIG. 13B. Hence, the amount of oxidative reaction heat in each of the cases shown in FIGS. 13C and 13D is between the amount thereof in the case of FIG. 13A and the amount thereof in the case of FIG. 13B. Thus, by changing the number of rich cylinders R or changing the number of lean cylinders L, the amount of oxidative reaction heat generated can be changed. This, in turn, makes it possible to change the rate of temperature rise of the NOx storage reduction catalyst 13, and the temperature thereof at the time of stabilization.

Figure 15A:
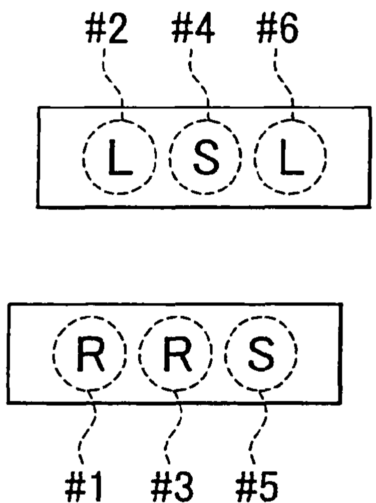
FIGS. 15A and 15B are diagrams showing an unpreferable example of a cylinder arrangement in a V-type 6-cylinder engine.
Figure 15B:
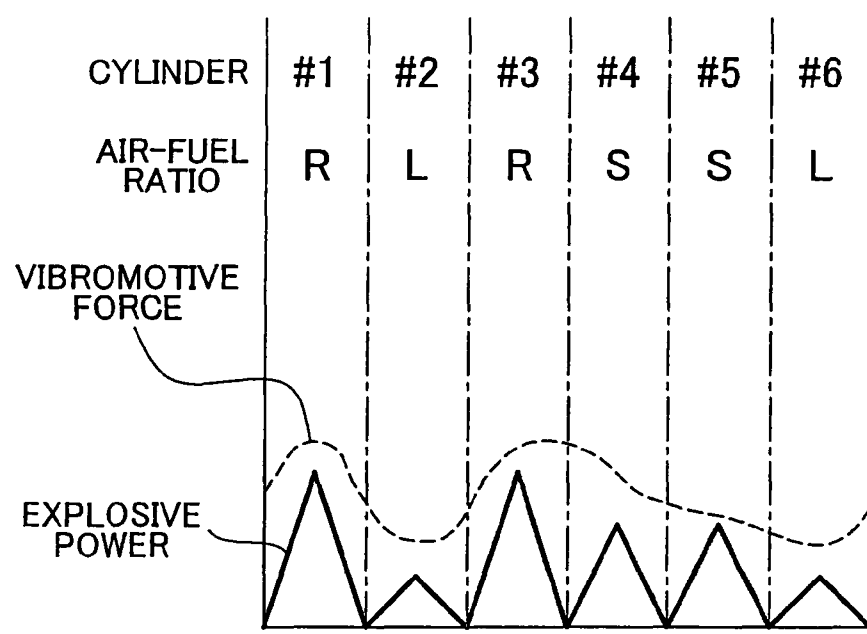
Figure 16A:
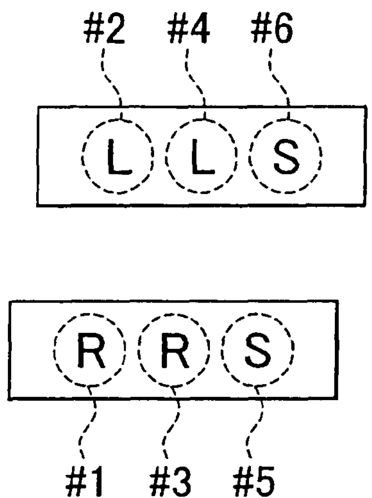
FIGS. 16A and 16B are diagrams showing an unpreferable example of a cylinder arrangement in a V-type 6-cylinder engine.
Figure 16B:
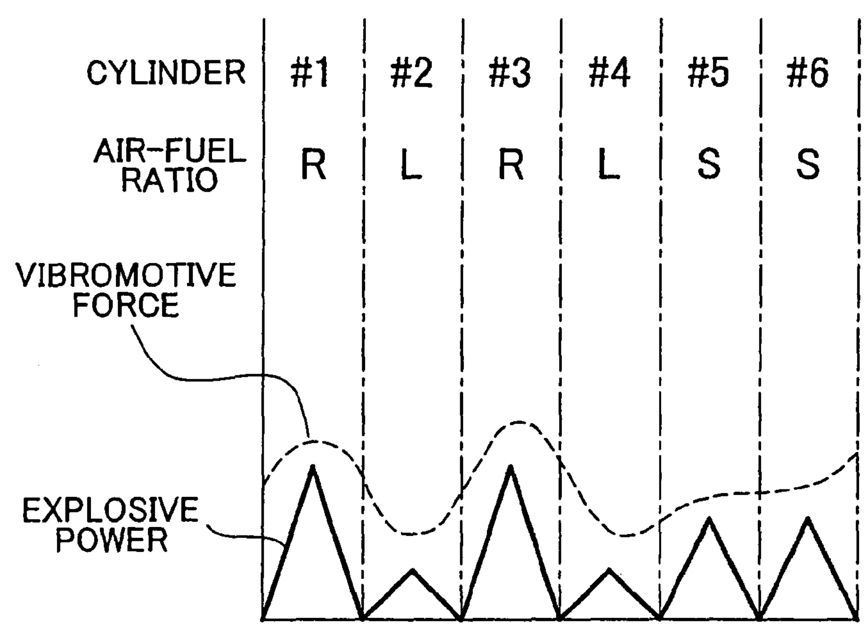

Next, with respect to the combinations shown in FIGS. 13A to 13D, preferable arrangements for achieving high frequencies of the vibromotive force will be successively described. With respect to the combination shown in FIG. 13A where the first cylinder group 1 is made up of two rich cylinders R and one stoichiometric cylinder S, and the second cylinder group 2 is made up of two lean cylinders L and one stoichiometric cylinder S, a preferable arrangement is shown in FIG. 14A, and unpreferable arrangements are shown in FIG. 15A and FIG. 16A.

Figure 14A:
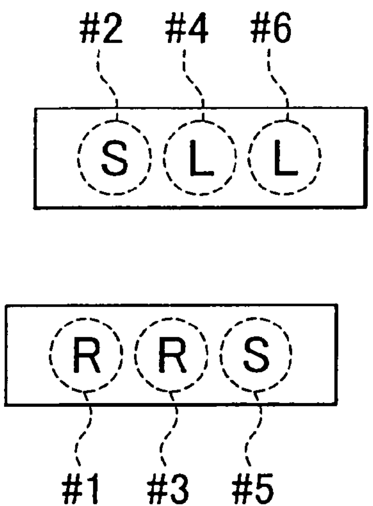
FIGS. 14A and 14B are diagrams showing a preferable example of a cylinder arrangement in a V-type 6-cylinder engine.
Figure 14B:
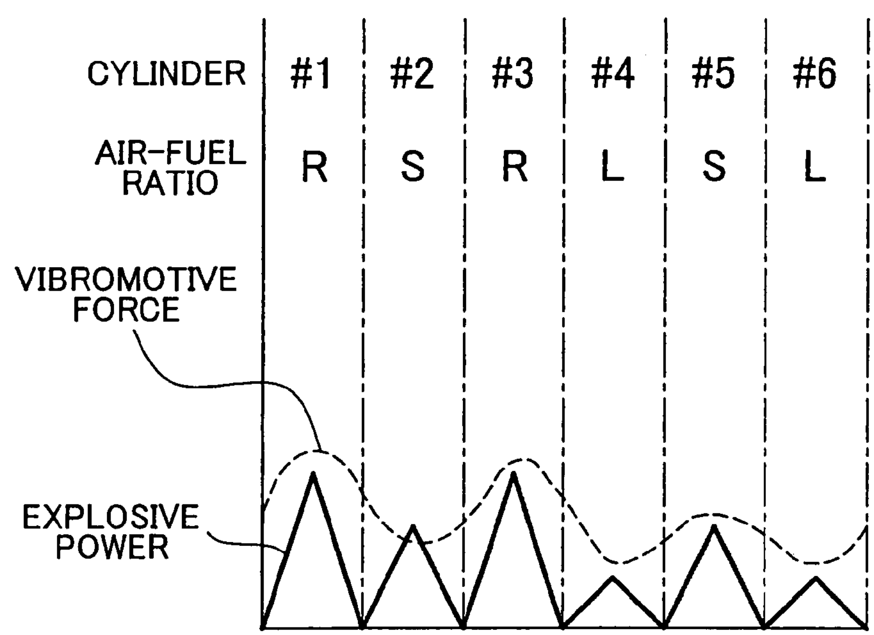

In the arrangement shown in FIG. 14A, the explosive power, that is, the output at the time of combustion, alternates between high and low sides every time combustion occurs, as shown in FIG. 14B. In consequence, the broken line of the vibromotive force has three peaks in one cycle, so that the frequency of the vibromotive force is high. On the other hand, in the examples shown in FIGS. 15A and 15B and FIGS. 16A and 16B, there are two consecutive combustions in stoichiometric cylinders S, and therefore the broken line of the vibromotive force has only two peaks in one cycle. Therefore, the frequency of the vibromotive force is comparatively low.

Therefore, it can be said that in order to achieve high frequency of the vibromotive force, it is preferable to determine an arrangement of rich cylinders R, stoichiometric cylinders S and lean cylinders L such that the output at the time of combustion alternates between high and low sides every time combustion occurs in accordance with a predetermined sequence of combustion of the cylinders.

Figure 17A:
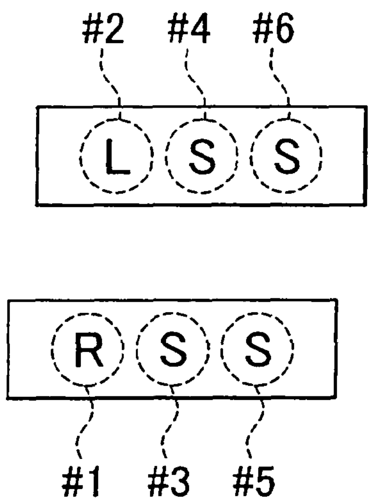
FIGS. 17A and 17B are diagrams showing a preferable example of a cylinder arrangement in a V-type 6-cylinder engine.
Figure 18A:
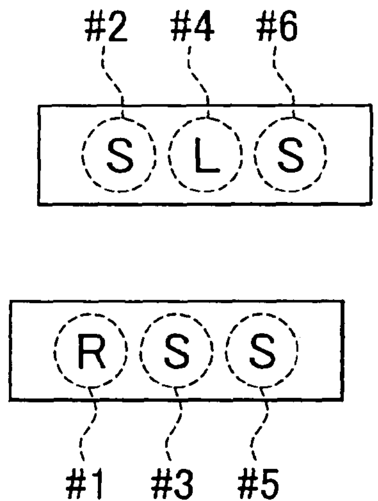
FIGS. 18A and 18B are diagrams showing an unpreferable example of a cylinder arrangement in a V-type 6-cylinder engine.

Next, with respect to the combination shown in FIG. 13B where the first cylinder group 1 is made up of one rich cylinder R and two stoichiometric cylinders S, and the second cylinder group 2 is made up of one lean cylinder L and two stoichiometric cylinders S, a preferable arrangement is shown in FIG. 17A, and an unpreferable arrangement is shown in FIG. 18A.

Figure 18B:
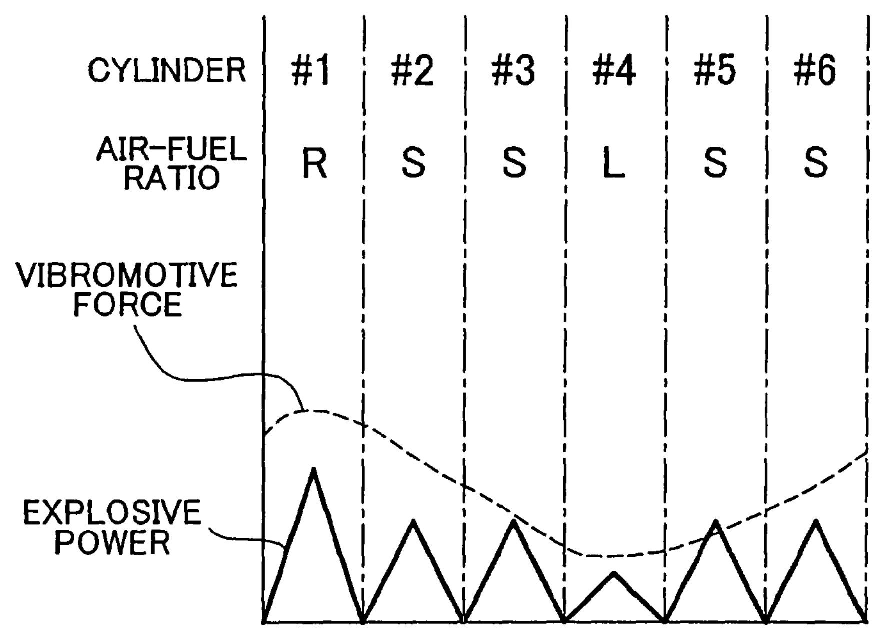

In the arrangement shown in FIG. 18A, combustion in a rich cylinder R and combustion in a lean cylinder L occur alternately at equal intervals, for example, at every 360° in crank angle, as shown in FIG. 18B. However, the combustion in the rich cylinder R and the combustion in the lean cylinder L occur at equal intervals, the vibromotive force fluctuates greatly at a low frequency as shown in FIG. 18B, resulting in vibration of the vehicle body and the like.

Figure 17B:
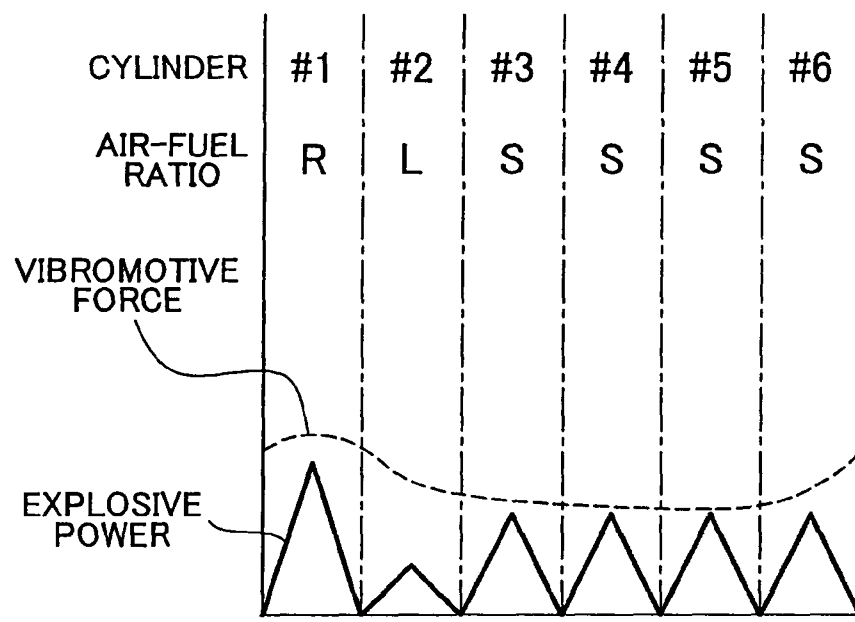

In contrast, in the case as shown in FIGS. 17A and 17B where the rich cylinder R combustion and the lean cylinder L combustion do not occur alternately at equal intervals, great vibromotive force does not occur. That is, it can be said that it is preferable to determine an arrangement of rich cylinders R, stoichiometric cylinders S and lean cylinders L such that the rich cylinder R combustion and the lean cylinder L combustion do not occur alternately at equal intervals when combustion occurs successively in the cylinders in accordance with a predetermined sequence of combustion.

Figure 19A:
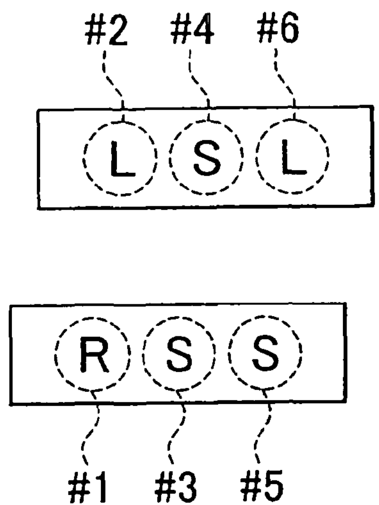
FIGS. 19A and 19B are diagrams showing a preferable example of a cylinder arrangement in a V-type 6-cylinder engine.
Figure 20A:
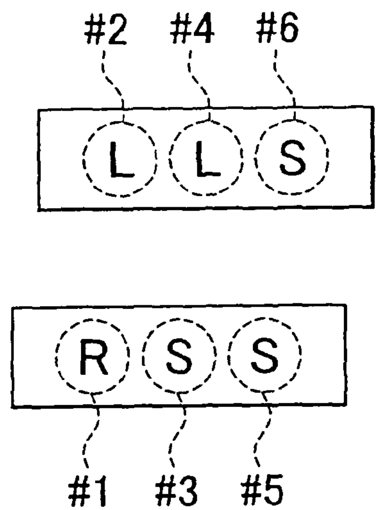
FIGS. 20A and 20B are diagrams showing an unpreferable example of a cylinder arrangement in a V-type 6-cylinder engine.

Next, with respect to the combination shown in FIG. 13C where the first cylinder group 1 is made up of one rich cylinder R and two stoichiometric cylinders S, and the second cylinder group 2 is made up of two lean cylinders L and one stoichiometric cylinder S, a preferable arrangement is shown in FIG. 19A, and an unpreferable arrangement is shown in FIG. 20A.

Figure 19B:
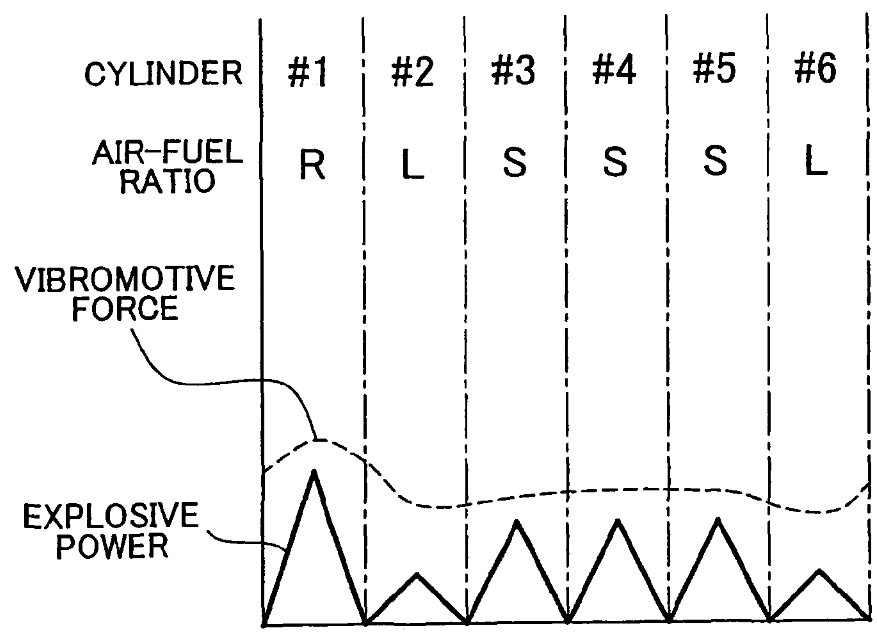
Figure 20B:
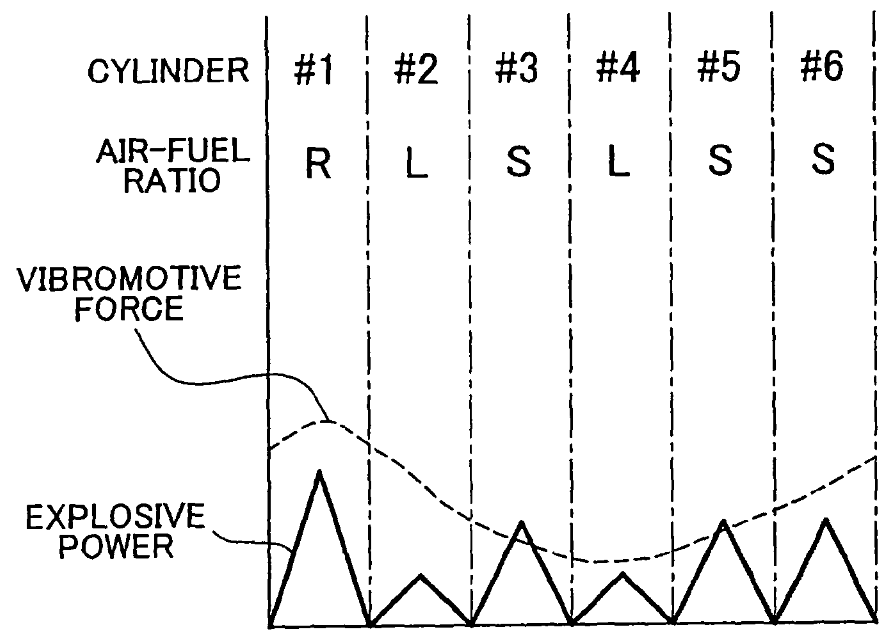

In the arrangement shown in FIG. 19A, the combustion in the rich cylinder R and the combustion in the lean cylinders L do not occur at equal intervals, as shown in FIG. 19B. Thus, great vibromotive force does not occur. On the other hand, in the arrangement shown in FIG. 20A, the combustion in the rich cylinder R and the combustion in a lean cylinder L occur at equal intervals as shown in FIG. 20B. In consequence, great vibromotive force occurs.

Figure 21A:
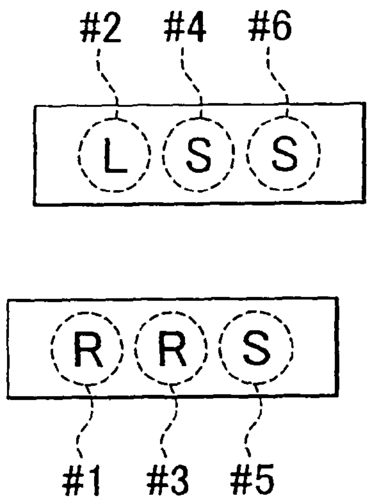
FIGS. 21A and 21B are diagrams showing a preferable example of a cylinder arrangement in a V-type 6-cylinder engine.
Figure 22A:
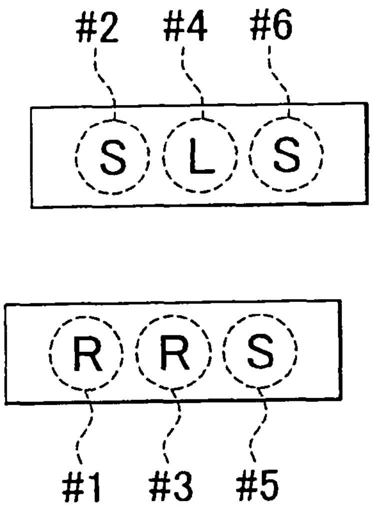
FIGS. 22A and 22B are diagrams showing an unpreferable example of a cylinder arrangement in a V-type 6-cylinder engine.

Next, with respect to the combination shown in FIG. 13D where the first cylinder group 1 is made up of two rich cylinders R and one stoichiometric cylinder S, and the second cylinder group 2 is made up of one lean cylinder L and two stoichiometric cylinders S, a preferable arrangement is shown in FIG. 21A, and an unpreferable arrangement is shown in FIG. 22A.

Figure 21B:
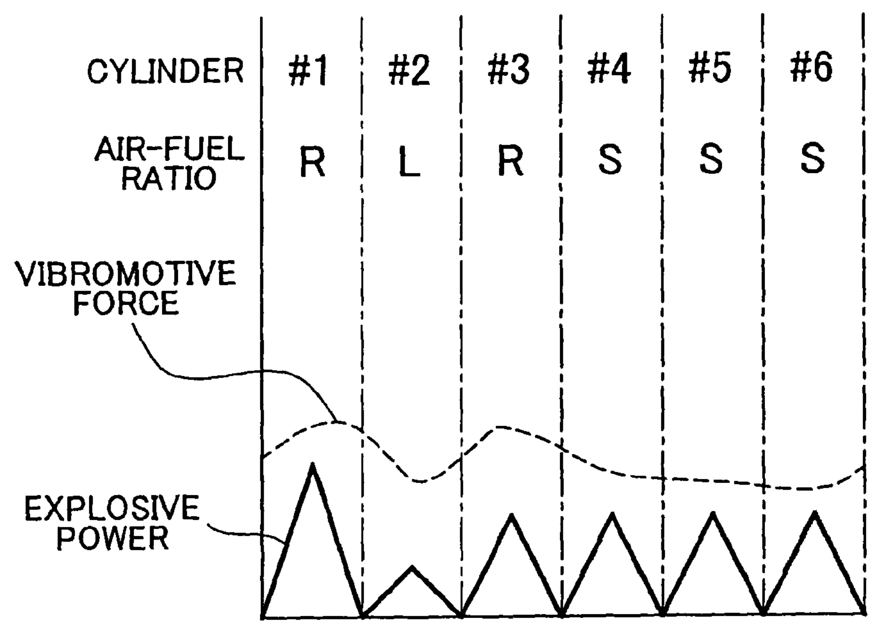
Figure 22B:
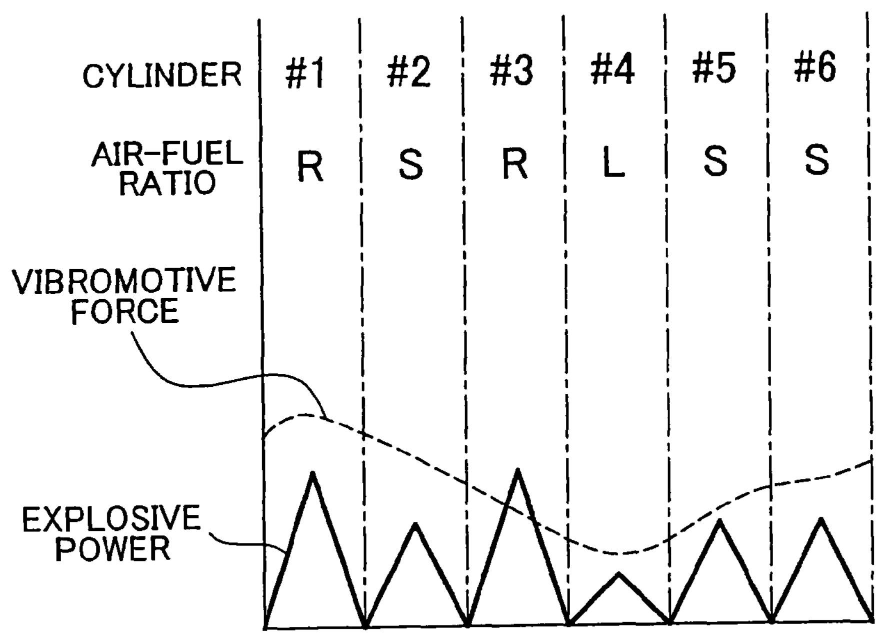

In the arrangement shown in FIG. 21A, the combustions in the rich cylinder R and the combustion in the lean cylinder L do not occur at equal intervals, as shown in FIG. 21B. Thus, great vibromotive force does not occur. On the other hand, in the arrangement shown in FIG. 22A, the combustion in a rich cylinder R and the combustion in the lean cylinder L occur at equal intervals as shown in FIG. 22B. In consequence, great vibromotive force occurs.

Incidentally, in order to achieve high frequency of the vibromotive force, it is preferable that the explosive power, that is, the output at the time of combustion, alternate between high and low sides, as mentioned above. In embodiments described below, the explosive power, that is, the output at the time of combustion, is caused to alternate between high and low sides, by retarding the ignition timing of at least one of the stoichiometric cylinders S. This will be described sequentially in conjunction with the combinations shown in FIGS. 13A to 13D.

Figure 23A:
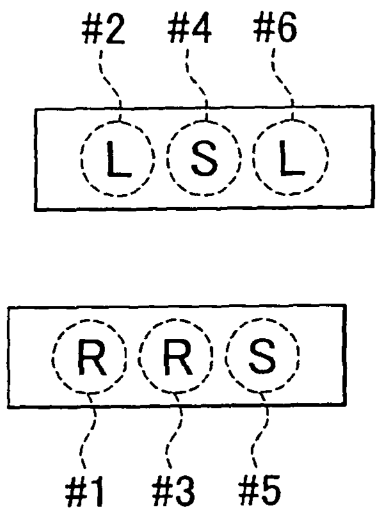
FIGS. 23A and 23B are diagrams showing a case where the ignition timing of at least one of stoichiometric cylinders is retarded in a V-type 6-cylinder engine.
Figure 23B:
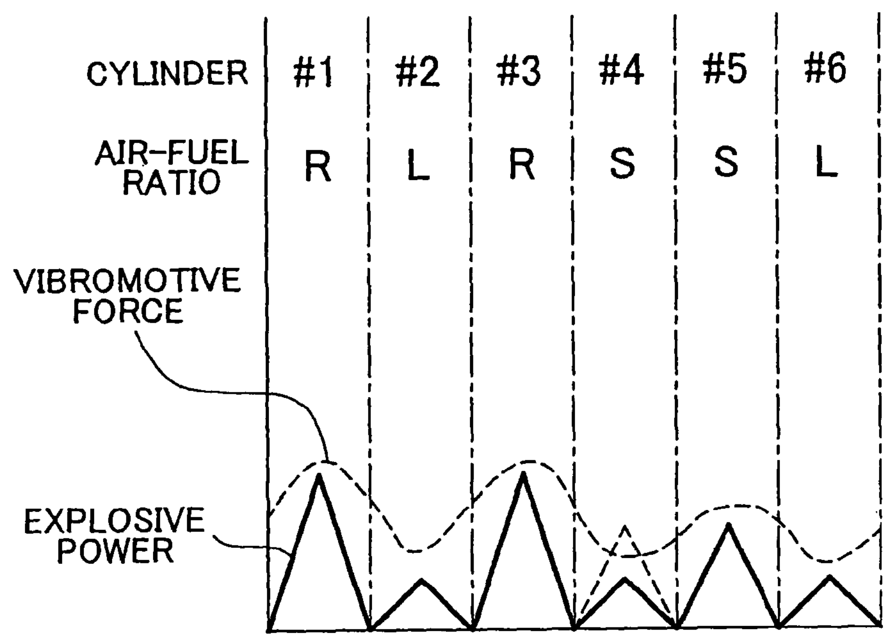
Figure 24A:
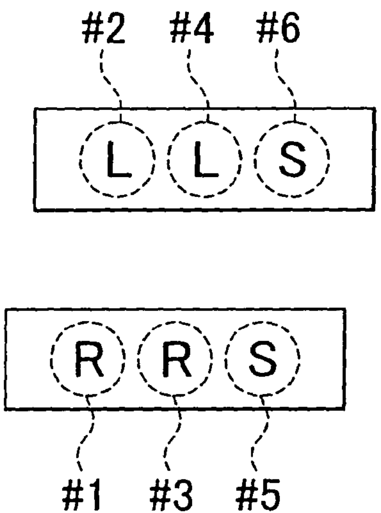
FIGS. 24A and 24B are diagrams showing another case where the ignition timing of at least one of stoichiometric cylinders is retarded in a V-type 6-cylinder engine.
Figure 24B:
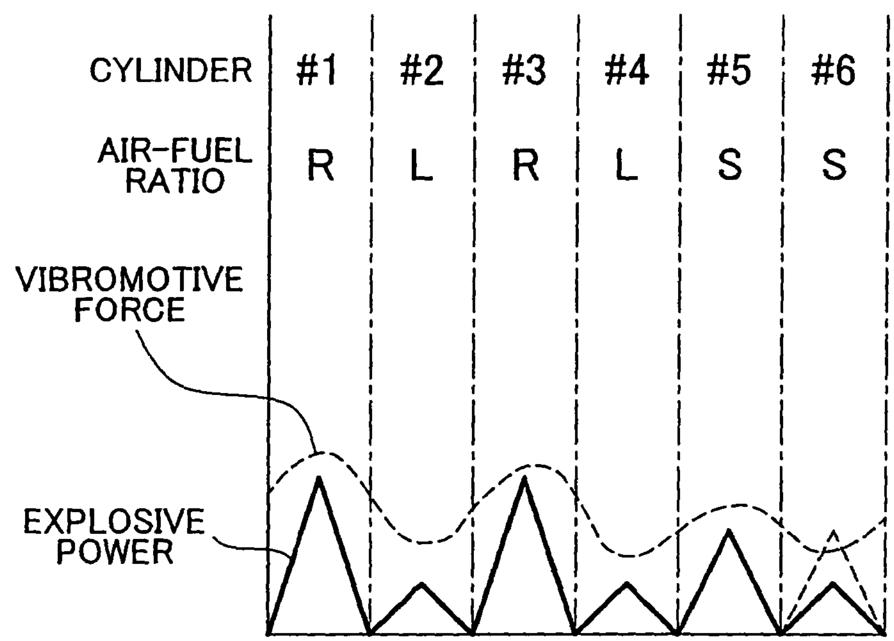

Examples where the aforementioned concept is applied to the combination shown in FIG. 13A where the first cylinder group 1 is made up of two rich cylinders R and one stoichiometric cylinder S, and the second cylinder group 2 is made up of two lean cylinders L and one stoichiometric cylinder S, are shown in FIGS. 23A and 23B, and FIGS. 24A and 24B. If the ignition timing is retarded in at least one of the stoichiometric cylinders S, the output at the time of combustion becomes less in the at least one ignition timing-retarded stoichiometric cylinders S than in the one or more stoichiometric cylinders S whose ignition timing is not retarded. In FIG. 23B and FIG. 24B, with regard to the stoichiometric cylinder S whose ignition timing is retarded, the explosive power that is produced with the un-retarded ignition timing is shown by a broken line. That is, in the case where explosive power is indicated by a broken line in FIGS. 23B and 24B, the ignition timing of the stoichiometric cylinder S is retarded, which applies to FIGS. 25B to 30B as well.

In the arrangement shown in FIG. 23A, the ignition timing of No. 4 cylinder #4, which is a stoichiometric cylinder S, is retarded, so that the explosive power, that is, the output at the time of combustion, alternates between high and low sides, as shown in FIG. 23B. In the arrangement shown in FIG. 24A, the ignition timing of No. 6 cylinder #6, which is a stoichiometric cylinder S, is retarded, so that the explosive power, that is, the output at the time of combustion, alternates between high and low sides, as shown in FIG. 24B.

Examples where the foregoing concepts are applied to the combination shown in FIG. 13B where the first cylinder group 1 is made up of one rich cylinder R and two stoichiometric cylinders S, and the second cylinder group 2 is made up of one lean cylinder L and two stoichiometric cylinders S, are shown in FIGS. 25A and 25B, and FIGS. 26A and 26B.

Figure 25A:
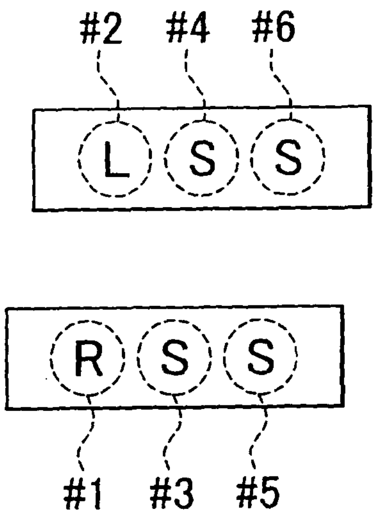
FIGS. 25A and 25B are diagrams showing still another case where the ignition timing of at least one of stoichiometric cylinders is retarded in a V-type 6-cylinder engine.
Figure 25B:
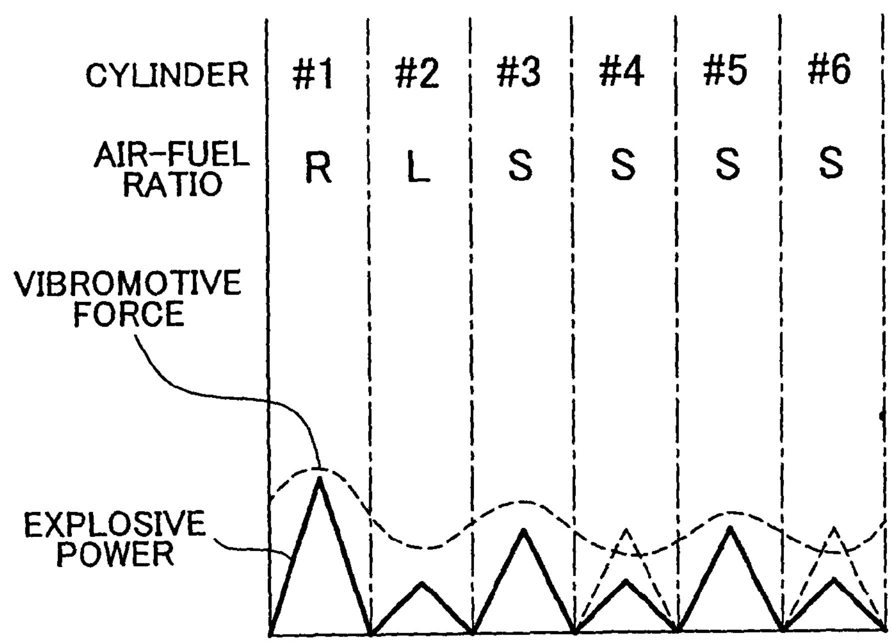
Figure 26A:
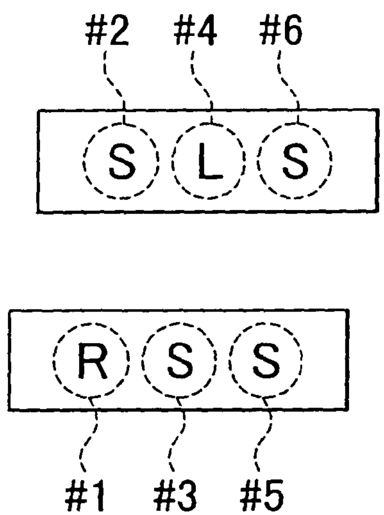
FIGS. 26A and 26B are diagrams showing a further case where the ignition timing of at least one of stoichiometric cylinders is retarded in a V-type 6-cylinder engine.
Figure 26B:
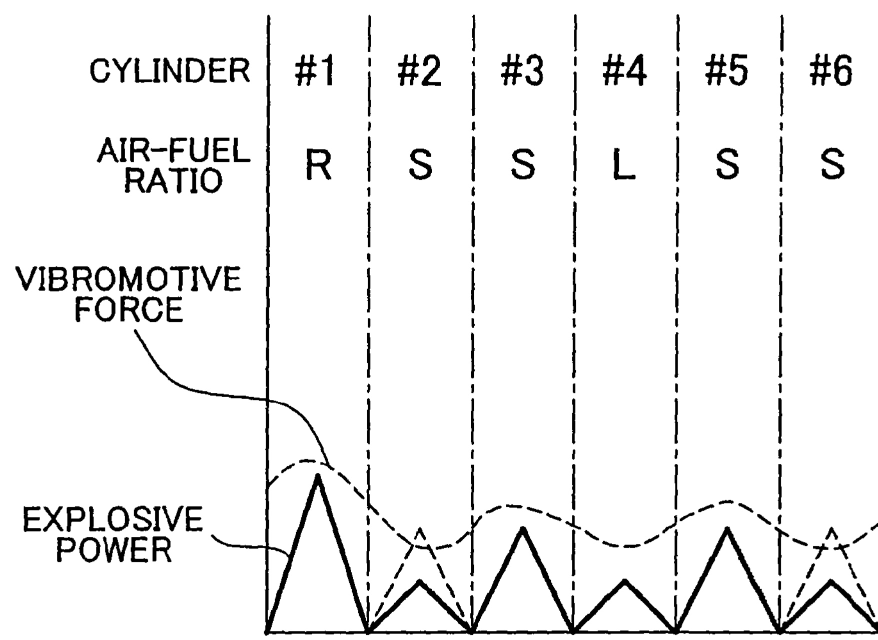

Specifically, in the arrangement shown in FIG. 25A, the ignition timing of No. 4 cylinder #4 and No. 6 cylinder #6, which are both stoichiometric cylinders S, is retarded, so that the explosive power, that is, the output at the time of combustion, alternates between high and low sides, as shown in FIG. 25B. In the arrangement shown in FIG. 26A, the ignition timing of No. 2 cylinder #2 and No. 6 cylinder #6, which are both stoichiometric cylinders S, is retarded, so that the explosive power, that is, the output at the time of combustion, alternates between high and low sides, as shown in FIG. 26B.

Examples where the foregoing concept is applied to the combination shown in FIG. 13C where the first cylinder group 1 is made up of one rich cylinder R and two stoichiometric cylinders S, and the second cylinder group 2 is made up of two lean cylinders L and one stoichiometric cylinder S, are shown in FIGS. 27A and 27B, and FIGS. 28A and 28B.

Figure 27A:
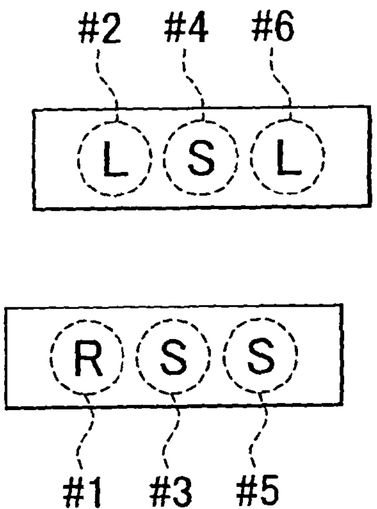
FIGS. 27A and 27B are diagrams showing a still further case where the ignition timing of at least one of stoichiometric cylinders is retarded in a V-type 6-cylinder engine.
Figure 27B:
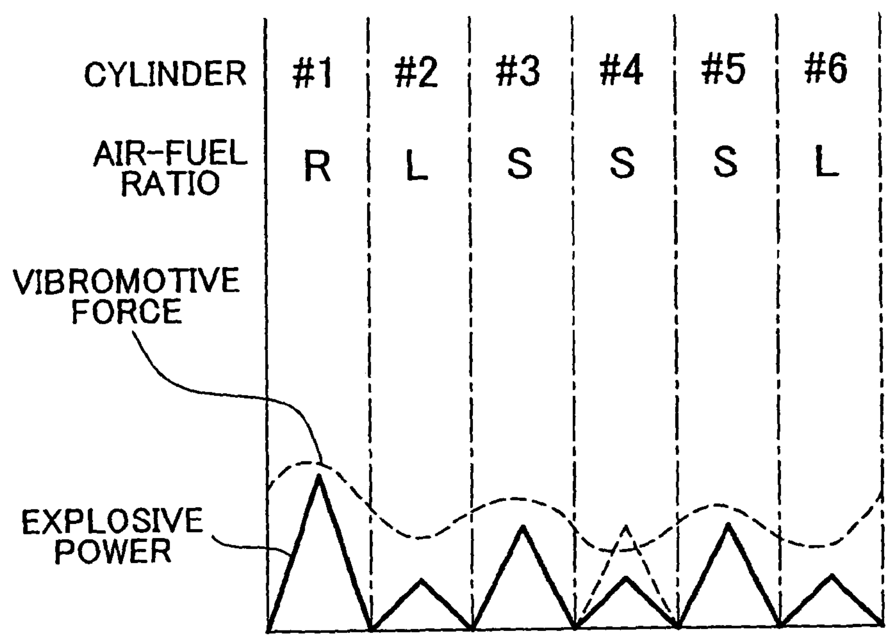
Figure 28A:
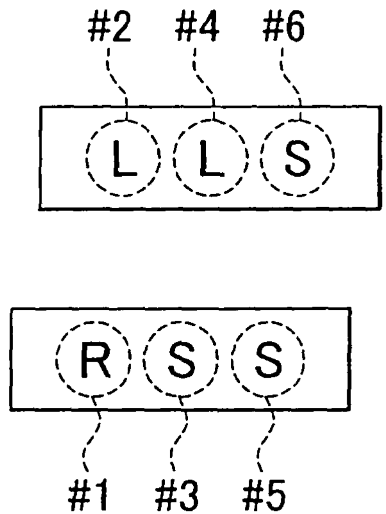
FIGS. 28A and 28B are diagrams showing a yet further case where the ignition timing of at least one of stoichiometric cylinders is retarded in a V-type 6-cylinder engine.
Figure 28B:
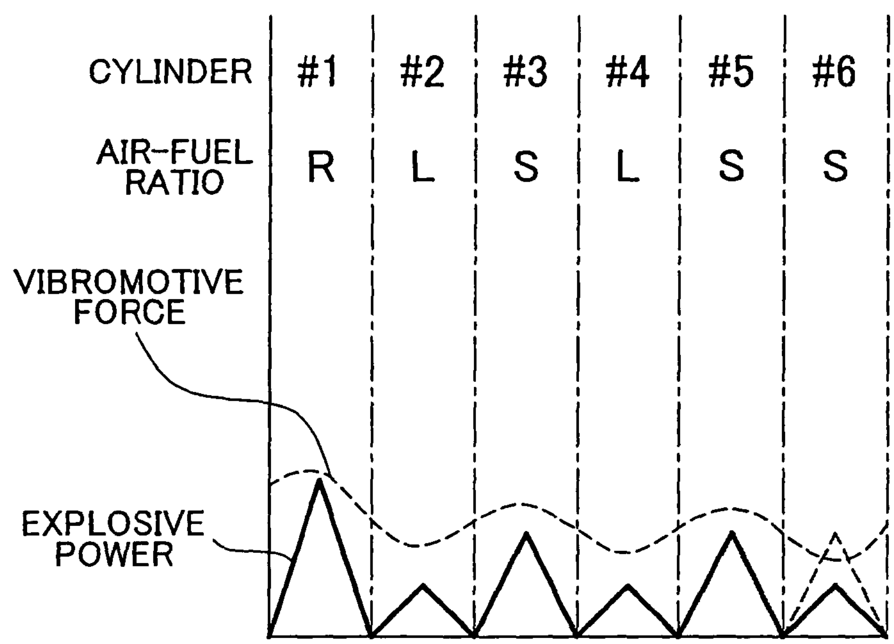

Specifically, in the arrangement shown in FIG. 27A, the ignition timing of No. 4 cylinder #4, which is a stoichiometric cylinder S, is retarded, so that the explosive power, that is, the output at the time of combustion, alternates between high and low sides, as shown in FIG. 27B. In the arrangement shown in FIG. 28A, the ignition timing of No. 6 cylinder #6, which is a stoichiometric cylinder S, is retarded, so that the explosive power, that is, the output at the time of combustion, alternates between high and low sides, as shown in FIG. 28B.

Examples where the aforementioned concept is applied to the combination shown in FIG. 13D where the first cylinder group 1 is made up of two rich cylinders R and one stoichiometric cylinder S, and the second cylinder group 2 is made up of one lean cylinder L and two stoichiometric cylinders S, are shown in FIGS. 29A and 29B, and FIGS. 30A and 30B.

Figure 29A:
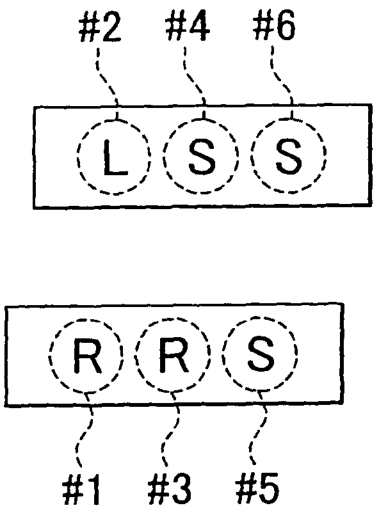
FIGS. 29A and 29B are diagrams showing a further case where the ignition timing of at least one of stoichiometric cylinders is retarded in a V-type 6-cylinder engine.
Figure 29B:
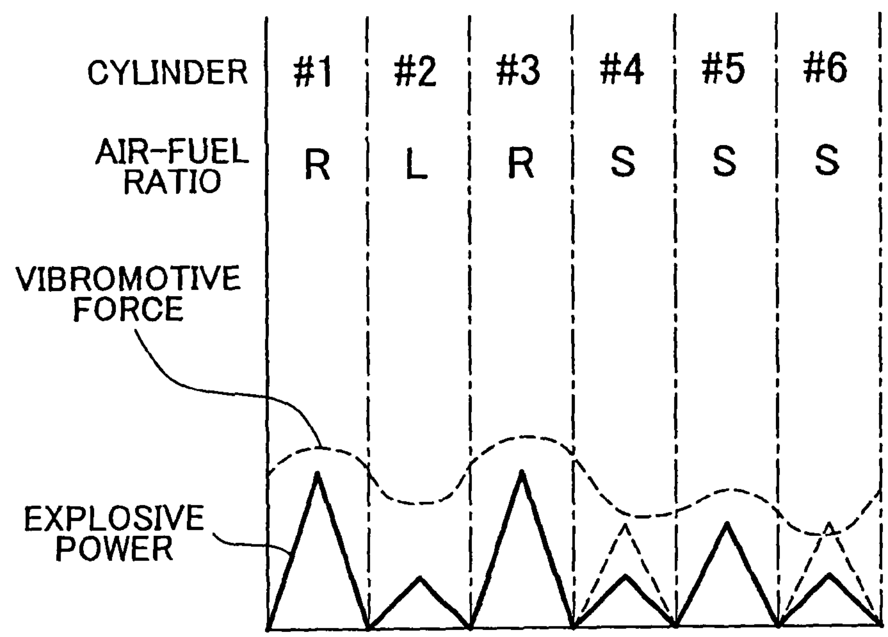
Figure 30A:
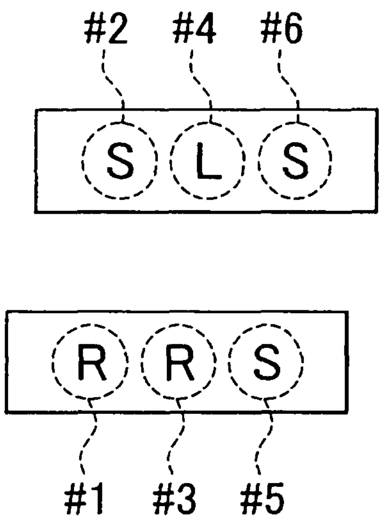
FIGS. 30A and 30B are diagrams showing a further case where the ignition timing of at least one of stoichiometric cylinders is retarded in a V-type 6-cylinder engine.
Figure 30B:
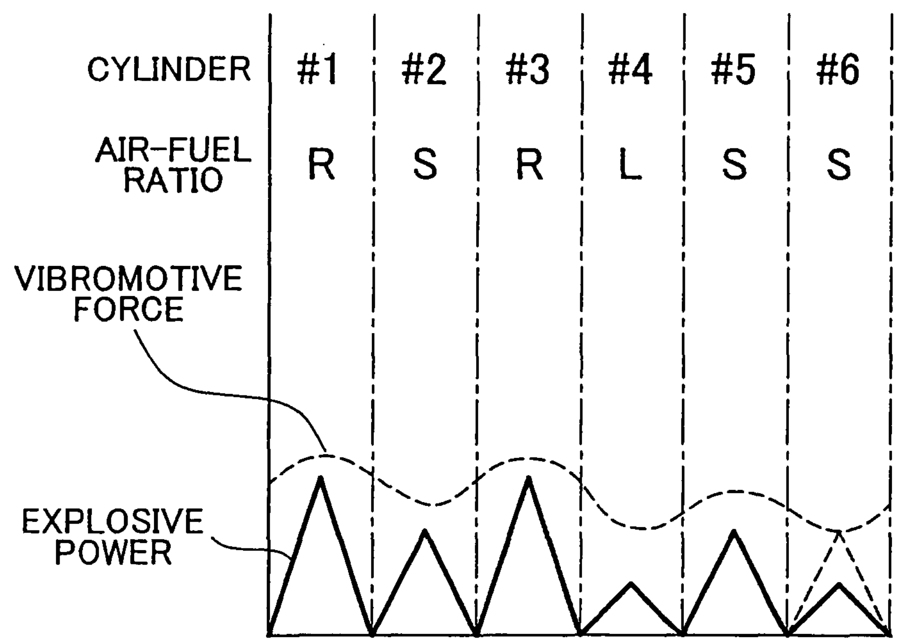

Specifically, in the arrangement shown in FIG. 29A, the ignition timing of No. 4 cylinder #4 and No. 6 cylinder #6, which are both stoichiometric cylinders S, is retarded, so that the explosive power, that is, the output at the time of combustion, alternates between high and low sides, as shown in FIG. 29B. In the arrangement shown in FIG. 30A, the ignition timing of No. 6 cylinder #6, which is a stoichiometric cylinder S, is retarded, so that the explosive power, that is, the output at the time of combustion, alternates between high and low sides, as shown in FIG. 30B.

In addition, the examples shown in FIGS. 23A to 30B can be described in other words. That is, it can be said that in the embodiments of the invention, an arrangement of one or more rich cylinders R, one or more ignition timing-not-retarded stoichiometric cylinders S, one or more ignition timing-retarded stoichiometric cylinders S, and one or more lean cylinders L is determined such that the output at the time of combustion alternates between high and low sides every time combustion occurs in accordance with a predetermined sequence of combustion of the cylinders.

The invention claimed is:

1. An exhaust purification apparatus of an internal combustion engine comprising:

six or more cylinders divided into a first cylinder group made up of at least three cylinders, and a second cylinder group made up of at least three cylinders;

a common first exhaust passageway connected to the first cylinder group;

a common second exhaust passageway connected to the second cylinder group;

first and second catalysts respectively provided in the common first exhaust passageway and the common second exhaust passageway; and a common NOx storage reduction catalyst connected to the common first exhaust passageway and the common second exhaust passageway on a downstream side from each of the first and second catalysts; and a controller that controls an air-fuel ratio of each of the six or more cylinders;

wherein, when a temperature of the common NOx storage reduction catalyst is to be raised, an average air-fuel ratio of one cylinder group of the first cylinder group and the second cylinder group is made rich, and an average air-fuel ratio of an other cylinder group of the first cylinder group and the second cylinder group is made lean, for the one cylinder group whose average air-fuel ratio is made rich when the temperature of the common NOx storage reduction catalyst is to be raised, the controller effects control such that an air-fuel ratio in at least two cylinders of the one cylinder group is made rich and an air-fuel ratio in an other cylinder or other cylinders of the one cylinder group is made stoichiometric or lean, or the air-fuel ratio in at least one cylinder of the one cylinder group is made rich and the air-fuel ratio in an other cylinder or other cylinders of the one cylinder group is made stoichiometric, and for the other cylinder group whose average air-fuel ratio is made lean when the temperature of the common NOx storage reduction catalyst is to be raised, the controller effects control such that an air-fuel ratio in at least two cylinders of the other cylinder group is made lean and an air-fuel ratio in an other cylinder or other cylinders of the other cylinder group is made stoichiometric or rich, or the air-fuel ratio in at least one cylinder of the other cylinder group is made lean and the air-fuel ratio in an other cylinder or other cylinders of the other cylinder group is made stoichiometric.

2. The exhaust purification apparatus according to claim 1, wherein, for the one cylinder group whose average air-fuel ratio is made rich when the temperature of the common NOx storage reduction catalyst is to be raised, the controller effects control such that the air-fuel ratio in the at least two cylinders of the one cylinder group is made rich and the air-fuel ratio in the other cylinder or the other cylinders of the one cylinder group is made lean, and for the other cylinder group whose average air-fuel ratio is made lean when the temperature of the common NOx storage reduction catalyst is to be raised, the controller effects control such that the air-fuel ratio in the at least two cylinders of the other cylinder group is made lean and the air-fuel ratio in the other cylinder or the other cylinders of the other cylinder group is made rich, and an arrangement of rich air-fuel ratio cylinders and lean air-fuel ratio cylinders is set such that combustion does not occur three or more times consecutively in rich air-fuel ratio cylinders when combustion occurs successively in the six or more cylinders in accordance with a predetermined sequence of combustion.

3. The exhaust purification apparatus according to claim 1, wherein the internal combustion engine is a six-cylinder internal combustion engine, for the one cylinder group whose average air-fuel ratio is made rich when the temperature of the common NOx storage reduction catalyst is to be raised, the controller effects control such that the air-fuel ratio in the at least one cylinder of the one cylinder group is made rich and the air-fuel ratio in the other cylinders of the one cylinder group is made stoichiometric, and for the other cylinder group whose average air-fuel ratio is made lean when the temperature of the common NOx storage reduction catalyst is to be raised, the controller effects control such that the air-fuel ratio in the at least one cylinder of the other cylinder group is made lean and the air-fuel ratio in the other cylinders of the other cylinder group is made stoichiometric, and a rate of temperature rise of the common NOx storage reduction catalyst is changed by changing a number of rich air-fuel ratio cylinders in the one cylinder group whose average air-fuel ratio is made rich, or changing a number of lean air-fuel ratio cylinders in the other cylinder group whose average air-fuel ratio is made lean.

4. The exhaust purification apparatus according to claim 1, wherein the internal combustion engine is a six-cylinder internal combustion engine having at least one rich air-fuel ratio cylinder, at least one stoichiometric air-fuel ratio cylinder and at least one lean air-fuel ratio cylinder, a combustion-time output of any one of the at least one rich air-fuel ratio cylinder is greater than the combustion-time output of any one of the at least one stoichiometric air-fuel ratio cylinder, the combustion-time output of any one of the at least one stoichiometric air-fuel ratio cylinder is greater than a combustion-time output of any one of the at least one lean air-fuel ratio cylinder, and wherein an arrangement of the at least one rich air-fuel ratio cylinder, the at least one stoichiometric air-fuel ratio cylinder and the at least one lean air-fuel ratio cylinder is set such that the combustion-time output alternates between a high side and a low side every time combustion occurs in accordance with a predetermined sequence of combustion in the six-cylinder internal combustion engine.

5. The exhaust purification apparatus according to claim 4, wherein an ignition timing of at least one stoichiometric air-fuel ratio cylinder is retarded so that the combustion-time output of any one of the at least one ignition timing-retarded stoichiometric air-fuel ratio cylinder is less than the combustion-time output of any one of at least one stoichiometric air-fuel ratio cylinder whose ignition timing is not retarded, and wherein an arrangement of the at least one rich air-fuel ratio cylinder, the at least one stoichiometric air-fuel ratio cylinder whose ignition timing is not retarded, the at least one ignition timing-retarded stoichiometric air-fuel ratio cylinder and the at least one lean air-fuel ratio cylinder is set such that the combustion-time output alternates between the high side and the low side every time combustion occurs in accordance with a predetermined sequence of combustion in the six-cylinder internal combustion engine.

6. The exhaust purification apparatus according to claim 1, wherein the internal combustion engine is a six-cylinder internal combustion engine having at least one rich air-fuel ratio cylinder, at least one stoichiometric air-fuel ratio cylinder and at least one lean air-fuel ratio cylinder, a combustion-time output of any one of the at least one rich air-fuel ratio cylinder is greater than the combustion-time output of any one of the at least one stoichiometric air-fuel ratio cylinder, the combustion-time output of any one of the at least one stoichiometric air-fuel ratio cylinder is greater than the combustion-time output of any one of the at least one lean air-fuel ratio cylinder, an arrangement of the at least one rich air-fuel ratio cylinder, the at least one stoichiometric air-fuel ratio cylinder and the at least one lean air-fuel ratio cylinder is set such that combustion in any one of the at least one rich air-fuel ratio cylinder and combustion in any one of the at least one lean air-fuel ratio cylinder do not occur alternately at equal intervals when combustion occurs successively in the six cylinder internal combustion engine in accordance with a predetermined sequence of combustion.

7. A control method for an exhaust purification apparatus of an internal combustion engine having six or more cylinders, the six or more cylinders being divided into a first cylinder group made up of at least three cylinders, and a second cylinder group made up of at least three cylinders, and the at least three cylinders of the first cylinder group are connected to a common first exhaust passageway, and the at least three cylinders of the second cylinder group are connected to a common second exhaust passageway, and the common first exhaust passageway and the common second exhaust passageway are respectively provided with first and second catalysts, and the common first exhaust passageway and the common second exhaust passageway are connected to a common NOx storage reduction catalyst downstream of the first and second catalysts, and a controller that controls an air-fuel ratio of each of the six or more cylinders, wherein when a temperature of the common NOx storage reduction catalyst is to be raised, an average air-fuel ratio of one cylinder group of the first cylinder group and the second cylinder group is made rich, and an average air-fuel ratio of an other cylinder group of the first cylinder group and the second cylinder group is made lean, comprising the steps of:

for the one cylinder group whose average air-fuel ratio is made rich when the temperature of the common NOx storage reduction catalyst is to be raised, making an air-fuel ratio in at least two cylinders of the one cylinder group rich by the controller and making an air-fuel ratio in an other cylinder or other cylinders of the one cylinder group stoichiometric or lean by the controller, or making the air-fuel ratio in at least one cylinder of the one cylinder group rich by the controller and making the air-fuel ratio in an other cylinder or other cylinders of the one cylinder group stoichiometric by the controller; and for the other cylinder group whose average air-fuel ratio is made lean when the temperature of the common NOx storage reduction catalyst is to be raised, making an air-fuel ratio in at least two cylinders of the other cylinder group lean by the controller and making an air-fuel ratio in an other cylinder or other cylinders of the other cylinder group stoichiometric or rich by the controller, or making the air-fuel ratio in at least one cylinder of the other cylinder group lean by the controller and making the air-fuel ratio in an other cylinder or other cylinders of the other cylinder group stoichiometric by the controller.

8. The control method according to claim 7, wherein, for the one cylinder group whose average air-fuel ratio is made rich when the temperature of the common NOx storage reduction catalyst is to be raised, the controller effects control such that the air-fuel ratio in the at least two cylinders of the one cylinder group is made rich and the air-fuel ratio in the other cylinder or the other cylinders of the one cylinder group is made lean, and as for the other cylinder group whose average air-fuel ratio is made lean when the temperature of the common NOx storage reduction catalyst is to be raised, the controller effects control such that the air-fuel ratio in the at least two cylinders of the other cylinder group is made lean and the air-fuel ratio in the other cylinder or the other cylinders of the other cylinder group is made rich, and an arrangement of rich air-fuel ratio cylinders and lean air-fuel ratio cylinders is set such that combustion does not occur three or more times consecutively in rich air-fuel ratio cylinders when combustion occurs successively in the six or more cylinders in accordance with a predetermined sequence of combustion.

9. The control method according to claim 7, wherein the internal combustion engine is a six-cylinder internal combustion engine, for the one cylinder group whose average air-fuel ratio is made rich when the temperature of the common NOx storage reduction catalyst is to be raised, the controller effects control such that the air-fuel ratio in the at least one cylinder of the one cylinder group is made rich and the air-fuel ratio in the other cylinders of the one cylinder group is made stoichiometric, and for the other cylinder group whose average air-fuel ratio is made lean when the temperature of the common NOx storage reduction catalyst is to be raised, the controller effects control such that the air-fuel ratio in the at least one cylinder of the other cylinder group is made lean and the air-fuel ratio in the other cylinders of the other cylinder group is made stoichiometric, and a rate of temperature rise of the common NOx storage reduction catalyst is changed by changing a number of rich air-fuel ratio cylinders in the one cylinder group whose average air-fuel ratio is made rich, or changing a number of lean air-fuel ratio cylinders in the other cylinder group whose average air-fuel ratio is made lean.

10. The control method according to claim 7, wherein the internal combustion engine is a six-cylinder internal combustion engine having at least one rich air-fuel ratio cylinder, at least one stoichiometric air-fuel ratio cylinder and at least one lean air-fuel ratio cylinder, a combustion-time output of any one of the at least one rich air-fuel ratio cylinder is greater than the combustion-time output of any one of the at least one stoichiometric air-fuel ratio cylinder, the combustion-time output of any one of the at least one stoichiometric air-fuel ratio cylinder is greater than the combustion-time output of any one of the at least one lean air-fuel ratio cylinder, and an arrangement of the at least one rich air-fuel ratio cylinder, the at least one stoichiometric air-fuel ratio cylinder and the at least one lean air-fuel ratio cylinder is set such that the combustion-time output alternates between a high side and a low side every time combustion occurs in accordance with a predetermined sequence of combustion in the six-cylinder internal combustion engine.

11. The control method according to claim 10, wherein an ignition timing of at least one of the stoichiometric air-fuel ratio cylinders cylinder is retarded so that the combustion-time output of any one of the at least one ignition timing-retarded stoichiometric air-fuel ratio cylinder is less than the combustion-time output of any one of at least one stoichiometric air-fuel ratio cylinder whose ignition timing is not retarded, and an arrangement of the at least one rich air-fuel ratio cylinder, the at least one stoichiometric air-fuel ratio cylinder whose ignition timing is not retarded, the at least one ignition timing-retarded stoichiometric air-fuel ratio cylinder and the at least one lean air-fuel ratio cylinder is set such that the combustion-time output alternates between the high side and the low side every time combustion occurs in accordance with a predetermined sequence of combustion in the six-cylinder internal combustion engine.

12. The control method according to claim 7, wherein the internal combustion engine is a six-cylinder internal combustion engine having at least one rich air-fuel ratio cylinder, at least one stoichiometric air-fuel ratio cylinder and at least one lean air-fuel ratio cylinder, a combustion-time output of any one of the at least one rich air-fuel ratio cylinder is greater than a combustion-time output of any one of the at least one stoichiometric air-fuel ratio cylinder, the combustion-time output of any one of the at least one stoichiometric air-fuel ratio cylinder is greater than a combustion-time output of any one of the at least one lean air-fuel ratio cylinder, and an arrangement of the at least one rich air-fuel ratio cylinder, the at least one stoichiometric air-fuel ratio cylinder and the at least one lean air-fuel ratio cylinder is set such that combustion in any one of the at least one rich air-fuel ratio cylinder and combustion in any one of the at least one lean air-fuel ratio cylinder do not occur alternately at equal intervals when combustion occurs successively in the six or more cylinders in accordance with a predetermined sequence of combustion.

* * * * *